US012634316B2

(12) United States Patent
Rinaldi et al.

(10) Patent No.: US 12,634,316 B2
(45) Date of Patent: May 19, 2026

(54) SYSTEMS AND METHODS FOR CORRESPONDENCE FRAUD DETECTION

(71) Applicant: Wells Fargo Bank, N.A., San Francisco, CA (US)

(72) Inventors: Leo Rinaldi, Matthews, NC (US); Kathryn Lynne Sanders, Charlotte, NC (US); Jaclyn Olmos-Lym, San Francisco, CA (US); Tanisha Patterson-Powe, Huntersville, NC (US); Kelvin Hay, Hattiesburg, MS (US); Robin Fulmer, Alvord, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 50 days.

(21) Appl. No.: 18/637,170

(22) Filed: Apr. 16, 2024

(65) Prior Publication Data

US 2025/0323927 A1 Oct. 16, 2025

(51) Int. Cl.
*H04L 9/40* (2022.01)
*G06F 40/194* (2020.01)
*G06V 30/412* (2022.01)

(52) U.S. Cl.
CPC ........ *H04L 63/1425* (2013.01); *G06F 40/194* (2020.01); *G06V 30/412* (2022.01); *H04L 63/0428* (2013.01); *H04L 63/1416* (2013.01)

(58) Field of Classification Search
CPC ............. H04L 63/1425; H04L 63/0428; H04L 63/1416; G06F 40/194; G06V 30/412
See application file for complete search history.

(56) References Cited

U.S. PATENT DOCUMENTS 9,195,985 B2 11/2015 Domenica
9,652,513 B2 5/2017 Anderson
(Continued)

FOREIGN PATENT DOCUMENTS

JP WO-2015118620 A1 * 3/2017 ............. G06Q 50/18
WO WO-2018071768 A1 * 4/2018 ............. G06V 30/40

OTHER PUBLICATIONS

L. Zhao, C. Chen and J. Huang, "Deep Learning-Based Forgery Attack on Document Images," in IEEE Transactions on Image Processing, vol. 30, pp. 7964-7979, 2021 (Year: 2021).*
(Continued)

*Primary Examiner* — Michael R Vaughan
(74) *Attorney, Agent, or Firm* — K&L Gates LLP

(57) ABSTRACT

Systems, apparatuses, methods, and computer program products are disclosed for providing correspondence fraud detection. An example method includes receiving candidate correspondence associated with a user and extracting, based on one or more artificial intelligence (AI) modeling techniques, correspondence content data from the candidate correspondence. The example method further includes detecting, based on the correspondence content data, a set of correspondence faults associated with the candidate correspondence. The example method further includes generating based on the set of correspondence faults, a fraud likelihood score associated with the candidate correspondence in order to determine an authenticity category for the candidate correspondence, where the authenticity category is indicative of whether the candidate correspondence originated from an enterprise with which the user is associated. The example method further includes providing a correspondence fraud evaluation, where the correspondence fraud evaluation comprises an indication of the authenticity category for the candidate correspondence.

20 Claims, 7 Drawing Sheets

(56) References Cited

U.S. PATENT DOCUMENTS

| | | | |
|---|---|---|---|
| 10,885,531 B2 * | 1/2021 | Burgin | G06Q 30/0185 |
| 11,354,917 B2 * | 6/2022 | Martin | G06V 10/50 |
| 11,392,954 B2 * | 7/2022 | Balayan | G06N 3/042 |
| 2004/0216031 A1 * | 10/2004 | Taylor | H04L 63/0428 |
| | | | 715/263 |
| 2014/0259157 A1 * | 9/2014 | Toma | H04L 51/212 |
| | | | 726/22 |
| 2015/0117701 A1 * | 4/2015 | Ross | G06V 10/225 |
| | | | 382/100 |
| 2015/0356306 A1 * | 12/2015 | Carter | G06F 21/64 |
| | | | 380/246 |
| 2017/0011479 A1 * | 1/2017 | Morimoto | G06F 16/334 |
| 2020/0184212 A1 * | 6/2020 | Anthony Samy | G06N 20/20 |
| 2020/0202221 A1 * | 6/2020 | Wang | G06N 3/088 |
| 2021/0158036 A1 * | 5/2021 | Huber, Jr. | G06V 30/413 |
| 2022/0351532 A1 * | 11/2022 | Gietema | G06F 18/214 |
| 2023/0186308 A1 * | 6/2023 | Babu | G06Q 20/108 |
| | | | 705/44 |
| 2024/0177512 A1 * | 5/2024 | Gils | G06Q 20/4016 |

OTHER PUBLICATIONS

Prillaman, Mckenzie; "ChatGPT detector' catches AI-generated papers with unprecedented accuracy", Nature Magazine, Nov. 6, 2023; retrieved from https://www.nature.com/articles/d41586-023-03479-4.

Desaire, Heather; et al., "Distinguishing academic science writing from humans or ChatGPT with over 99% accuracy using off-the-shelf machine learning tools", Cell Reports Physical Science, vol. 4, Issue 6, 101426; Jun. 7, 2023; retrieved from https://www.cell.com/action/showPdf?pii=S2666-3864%2823%2900200-X.

Desaire, Heather; et al., "Accurately detecting AI text when ChatGPT is told to write like a chemist", Cell Reports Physical Science, vol. 4, Issue 11, 101672; Nov. 15, 2023; retrieved from https://www.cell.com/action/showPdf?pii=S2666-3864%2823%2900501-5.

* cited by examiner

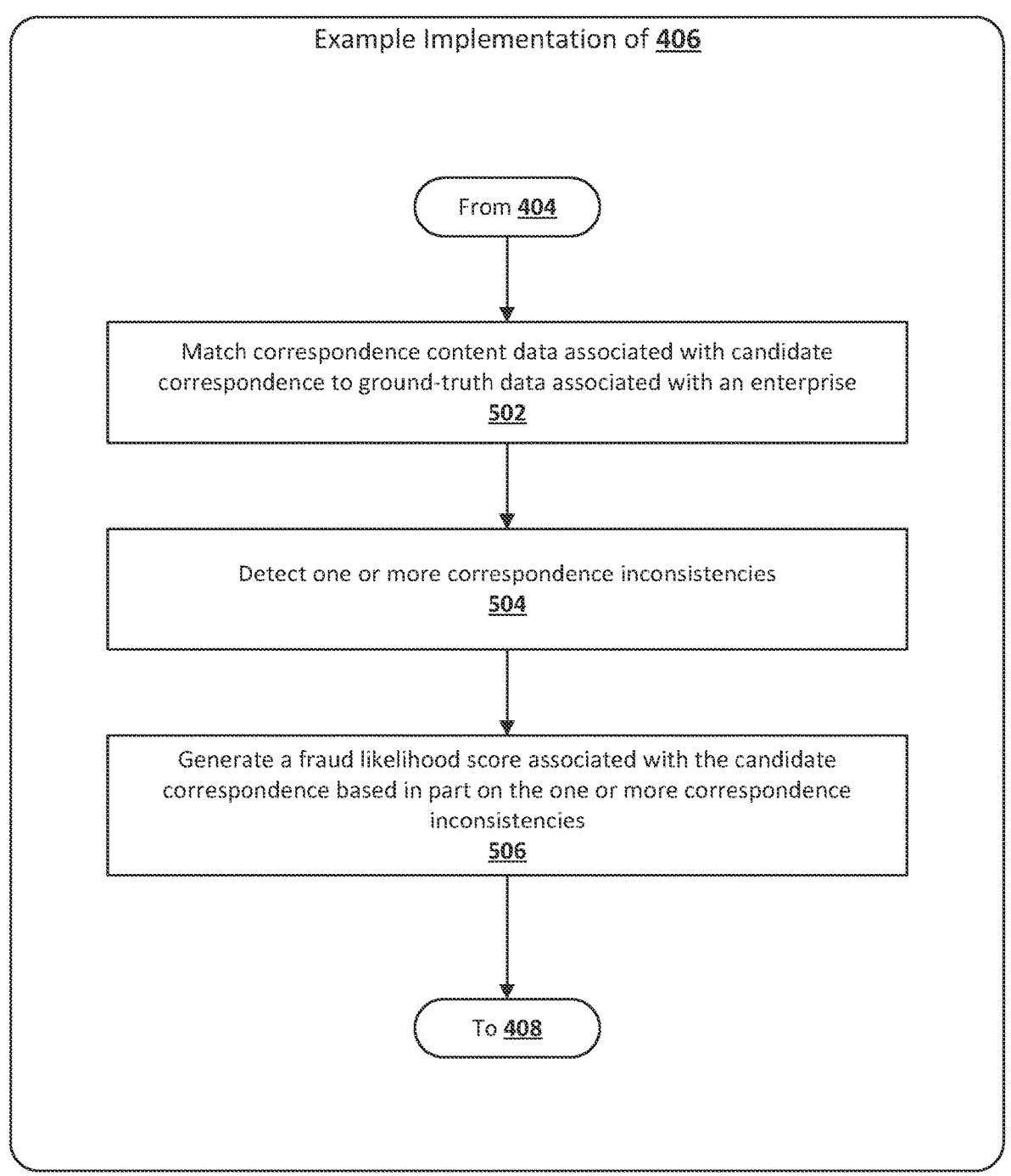

Example Implementation of 406

From 404

Match correspondence content data associated with candidate correspondence to ground-truth data associated with an enterprise
502

Detect one or more correspondence inconsistencies
504

Generate a fraud likelihood score associated with the candidate correspondence based in part on the one or more correspondence inconsistencies
506

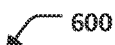

600

Example Implementation of 408

From 406

Determine a candidate correspondence configuration of a candidate correspondence
602

Compare the candidate correspondence configuration to at least a first known correspondence configuration
604

Generate a document similarity score associated with the candidate correspondence and the first known correspondence configuration
606

Generate a fraud likelihood score associated with the candidate correspondence based in part on the document similarity score
608

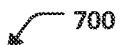

Example Implementation of 408

From 406

Receive a correspondence authentication object decryption request
702

Decrypt a correspondence authentication object associated with candidate correspondence
704

Generate a correspondence delivery matching score
706

Generate a fraud likelihood score associated with the candidate correspondence based in part on the correspondence delivery matching score
708

SYSTEMS AND METHODS FOR CORRESPONDENCE FRAUD DETECTION

BACKGROUND

Schemes to defraud individuals have become increasingly sophisticated, and bad actors have devised many insidious tactics designed to deceive individuals into providing sensitive data, personal information, and/or valuable resources. Furthermore, conventional fraud detection systems and techniques exhibit numerous drawbacks, inefficiencies, and limitations.

BRIEF SUMMARY

Users may receive various correspondence from enterprises with which the users have an account (e.g., a financial institution, bank, business, corporation, government agency, municipality office, and/or the like). However, in some instances, a particular piece of correspondence may be produced and/or provided by fraudsters attempting to gain access to a user's account, sensitive data, personal information, and/or valuable resources. As various schemes to defraud individuals have become increasingly sophisticated, it may be difficult for users to discern the difference between legitimate correspondence and fraudulent correspondence. For instance, fraudsters may acquire a small portion of identifying information about a respective user and/or an enterprise that the user is associated with (e.g., publicly available information and/or private information), generate fraudulent correspondence that targets the respective user, and deliver the fraudulent correspondence to the respective user in hopes that the fraudulent correspondence will solicit an action and/or response from the user (e.g., providing sensitive data, account data, access to resources, proprietary information, and/or the like).

In some scenarios, various enterprises may have a large number of branches which have been authorized to generate correspondence in the name of the enterprise. For example, a local branch of a national financial institution may be authorized to generate correspondence comprising a letterhead, logo, format, and/or the like associated with the national financial institution. Because such large enterprises may be associated with a nationally known brand, fraudsters may be able to digitally recreate recognizable logos, slogans, letterhead, icons, images, and/or the like that are representative of the enterprise. In this regard, it may be untenable for such a large enterprise to authenticate each piece of correspondence generated and/or delivered in the name of the enterprise.

Compounding these technological problems is the fact that, historically, enterprises have not had an efficient, effective way to assure users that the correspondence the users have received in the name of the enterprise is indeed authentic and trustworthy. As such, the conventional means for verifying the authenticity of correspondence received from a respective enterprise results in high costs, wasted technological resources, and loss of trust. For example, with respect to physical correspondence received by mail, conventional fraud mitigation techniques may require a user to contact respective enterprise personnel (e.g., via telephone, email, in writing, etc.) to inquire as to whether a piece of correspondence (e.g., a physical letter) is authentic. However, in some circumstances, the respective enterprise personnel may not be able to verify the authenticity or accuracy of the correspondence as there may be no record system in place for documenting external enterprise communications (e.g., mailing records, correspondence records, phone records, etc.). Additionally or alternatively, in some circumstances, the correspondence may have originated from a local branch of the enterprise whose external communications have not been documented and/or have not been provided to a centralized entity of the enterprise such that enterprise personnel may not be able to verify the authenticity or accuracy of the correspondence. Such inefficiencies may lead a user to disregarding potentially authentic correspondence or, worse, taking one or more actions based on fraudulent correspondence that result in the loss of sensitive data, personal information, and/or valuable resources.

In contrast to conventional techniques for detecting and/or mitigating problems related to fraudulent correspondence, example embodiments described herein comprise a correspondence fraud detection system configured to provide dynamic correspondence fraud detection. In example embodiments, the correspondence fraud detection system may, at least in part, (i) receive candidate correspondence associated with a user; (ii) extract correspondence content data from the candidate correspondence; (iii) detect, based on the correspondence content data, a set of correspondence faults associated with the candidate correspondence; (iv) generate, based on the set of correspondence faults, a fraud likelihood score associated with the candidate correspondence; (v) determine, based on the fraud likelihood score, an authenticity category for the candidate correspondence; and (vi) determine, based on the authenticity category, whether the candidate correspondence originated from an enterprise with which the user is associated.

Accordingly, the present disclosure sets forth systems, methods, and apparatuses that provide dynamic correspondence fraud detection. There are many advantages of these, and other embodiments described herein. One advantage the correspondence fraud detection system provides, as described herein, is an improvement to the functioning of the computing infrastructure of an enterprise, such as by reducing the burden on computing resources. For instance, the correspondence fraud detection system described herein reduces the complexity of authenticating one or more pieces of correspondence by, among other things, automating processes such as submitting a piece of correspondence to a respective enterprise for verification of authenticity, authenticating said piece of correspondence via an artificial intelligence (AI)-based correspondence fraud detection model, and/or alerting an enterprise representative and/or a user regarding suspected fraudulent correspondence.

Another advantage of the correspondence fraud detection system, as described herein, is an improvement to network security technologies and/or authentication technologies by providing an increased security for data, information, and/or valuable resources related to users and/or enterprises by leveraging an AI-based correspondence fraud detection model to extract correspondence content data associated with a candidate correspondence and match the extracted correspondence content data to ground-truth data associated with an enterprise. In this regard, the AI-based correspondence fraud detection model may be employed to detect various correspondence errors and/or correspondence inconsistencies in the candidate correspondence that may not be readily apparent to a user who has received the candidate correspondence. As a non-limiting example, a user may not be aware of various user data obfuscation rules associated with the enterprise that dictate how much, or in what manner, various user data is to be conveyed in an authentic piece of correspondence. As such, the user may not recognize that their personally identifiable information (PII) and/ or account data has been presented in a manner that is incorrect or inconsistent with the various correspondence rules and/or guidelines associated with the enterprise.

Additionally, the example embodiments described herein further improve upon conventional fraud detection techniques as the AI-based correspondence fraud detection model described herein may be configured to determine a candidate correspondence configuration (e.g., form, style, etc.) characterized by a layout of the correspondence content data for any candidate correspondence received by a user. In this regard, the AI-based correspondence fraud detection model may be configured to subsequently compare (e.g., match) the candidate correspondence configuration to one or more known correspondence configurations comprised in a library of forms associated with the enterprise in order to determine whether the candidate correspondence originated from the enterprise.

Moreover, the example embodiments described herein further improve upon conventional fraud detection techniques as the correspondence fraud detection system described herein may be configured to decrypt one or more correspondence authentication objects associated with a particular candidate correspondence. Non-limiting examples of a correspondence authentication object may include a quick response (QR) code, a data matrix, a barcode, and/or the like. In such example embodiments, the correspondence fraud detection system may facilitate the decryption of the one or more correspondence authentication objects in order to access correspondence identification information associated with the candidate correspondence. In this regard, the AI-based correspondence fraud detection model may be configured to match the correspondence identification information to one or more correspondence delivery records stored by the enterprise in order to determine if the candidate correspondence is fraudulent.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 5 illustrates an example flowchart diagram for generating a fraud likelihood score based in part on detecting correspondence inconsistencies in candidate correspondence in accordance with some example embodiments described herein.

FIG. 6 illustrates an example flowchart for generating a fraud likelihood score based in part on a document similarity score for use in detecting correspondence fraud in accordance with some example embodiments described herein.

FIG. 7 illustrates an example flowchart for generating a fraud likelihood score based in part on decrypting a correspondence authentication object associated with a candidate correspondence for use in detecting correspondence fraud in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "user device" or "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
FIG. 1 illustrates a system in which some example embodiments may be used for incorporating a correspondence fraud detection system.
Figure 1:
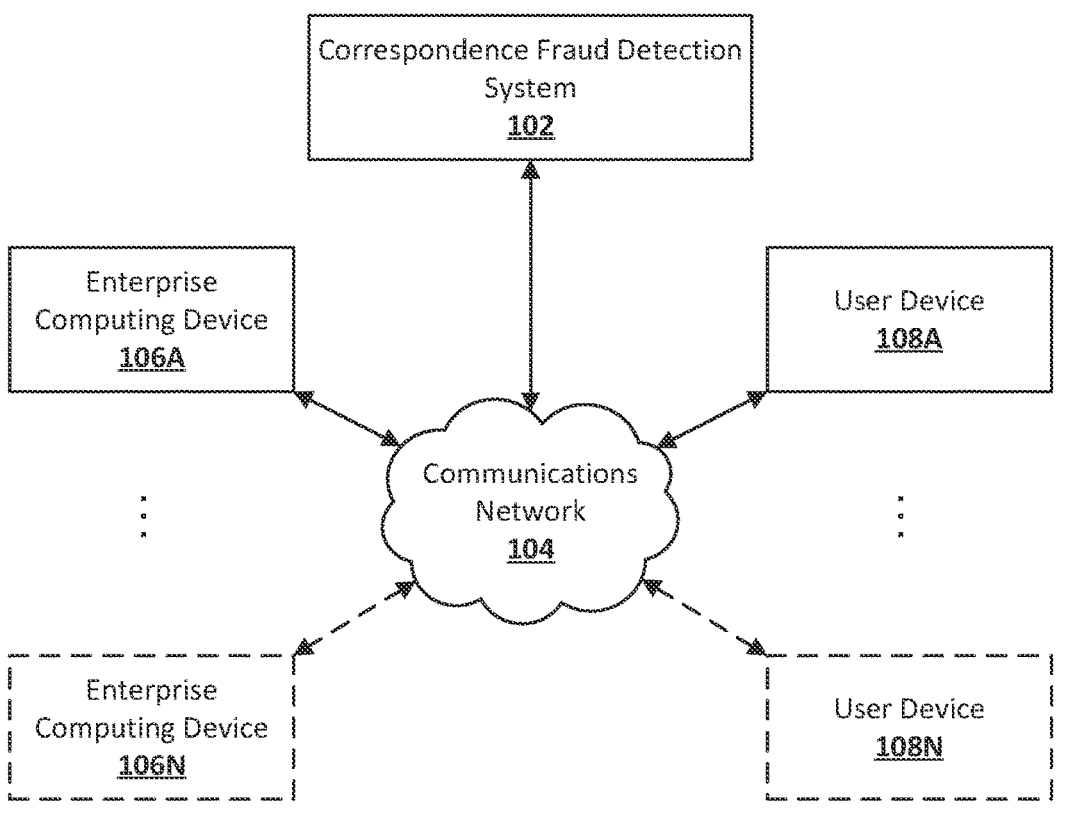

Example embodiments described herein may be implemented using any of a variety of computing devices or servers. To this end, FIG. 1 illustrates an example environment 100 within which various embodiments may operate. As illustrated, a correspondence fraud detection system 102 may receive and/or transmit information via communications network 104 (e.g., the Internet) with any number of other devices, such as one or more of enterprise computing devices 106A-106N and/or user devices 108A-108N. The correspondence fraud detection system 102 may be implemented as one or more computing devices or servers, which may be composed of a series of components. Particular components of the correspondence fraud detection system 102 are described in greater detail below with reference to apparatus 200 in connection with FIG. 2.

In various embodiments, the correspondence fraud detection system 102 may be associated with an enterprise (e.g., a financial institution, bank, and/or the like) and may be configured to manage various correspondence authentication processes for users associated with said enterprise. For example, the correspondence fraud detection system 102 may be configured to manage, execute, initiate, and/or otherwise facilitate one or more correspondence delivery verification processes, correspondence content data management processes, correspondence fraud detection processes, correspondence fraud evaluation processes, suspected fraudulent correspondence alert transmission processes, enterprise data management processes, user login processes, user identity verification processes, and/or the like for a plurality of users associated with a respective enterprise. In one or more embodiments, the correspondence fraud detection system 102 may be configured to detect correspondence fraud by receiving candidate correspondence from one or more user devices associated with the one or more users (e.g., enterprise computing devices 106A-106N, user devices 108A-108N, and/or the like) via the communications network 104. As will be described in further detail herein, the correspondence fraud detection system 102 may be configured to receive candidate correspondence in various formats and from various sources. As a non-limiting example, the candidate correspondence may be a digital representation of printed correspondence (e.g., correspondence received by the user in the mail), and the candidate correspondence may be generated based on imaging and/or scanning the printed correspondence via an imaging device associated with the user.

In this regard, various users associated with an enterprise may interact with the correspondence fraud detection system 102 via a software application instance, where the software application instance may be configured to facilitate one or more of the various correspondence fraud detection processes described herein. In various embodiments, the software application instance associated with the correspondence fraud detection system 102 may be installed and/or downloaded to a user device (e.g., a user device 108A configured as a mobile device, laptop, and/or the like) and may present one or more user interface configurations to a respective user.

As such, the software application instance associated with the correspondence fraud detection system 102 may be configured to guide a user through the various steps of a correspondence fraud detection process. For example, the software application instance associated with the correspondence fraud detection system 102 may be configured to cause display of various interactive user interface elements to the user to facilitate the capture and/or reception of candidate correspondence from the user, and/or enable the user to manage one or more portions of user data (e.g., user profile data, user account data, and/or other user data). In such example embodiments, the software application instance may be configured to facilitate the imaging and/or scanning of various printed correspondence received by a user by employing an image capturing device (e.g., a rear-facing camera) of a user device (e.g., user device 108A) to image and/or scan the printed correspondence. Additionally, in various embodiments, the software application instance associated with the correspondence fraud detection system 102 may be configured to enable a user to access a software application framework related to a respective enterprise by, for example, granting (e.g., transmitting, enabling, toggling, configuring, etc.) one or more access permissions for a user device (e.g., a user device 108A) associated with the user, where the one or more access permissions enable the user device to access the software application framework associated with the enterprise.

In some embodiments, the correspondence fraud detection system 102 includes, embodies, and/or otherwise integrates with a correspondence fraud detection model configured to facilitate one or more of the various correspondence fraud detection operations described herein. In various embodiments, the correspondence fraud detection model may be configured to execute various machine learning (ML), machine vision (MV), AI, generative AI, natural language processing (NLP), and/or optical character recognition (OCR) techniques. For example, the correspondence fraud detection model may be configured to process and/or extract various features and correspondence content data from candidate correspondence received by a user in order to execute one or more fraud detection techniques. In various embodiments, the correspondence fraud detection model may be a supervised or unsupervised model and may be configured as an artificial neural network (ANN), recurrent neural network (RNN), convolutional neural network (CNN), long short-term memory (LSTM) network, transformer model, rules-based model, or any other suitable deep learning model. In some embodiments, the correspondence fraud detection system 102 may train (e.g., initially, periodically, iteratively, etc.) a supervised correspondence fraud detection model using supervised training techniques (e.g., using labeled training data, classification, regression, etc.) described herein to perform one or more operations described in further detail in connection with FIGS. 4-7. In other embodiments, the correspondence fraud detection system 102 may train (e.g., initially, periodically, iteratively, etc.) an unsupervised correspondence fraud detection model using unsupervised training techniques (e.g., using unlabeled training data, clustering, association, etc.) described herein to perform one or more operations described in further detail in connection with FIGS. 4-7. Additionally or alternatively, the correspondence fraud detection model may be configured to embody and/or integrate with one or more discrete AI models configured to perform a specific task associated with the methods described herein.

For example, in various embodiments, the correspondence fraud detection model may be configured to extract correspondence content data from candidate correspondence received from a user in order to execute various fraud detection operations. In this regard, the correspondence fraud detection model may be configured to detect a set of correspondence faults associated with a candidate correspondence based on the correspondence content data extracted from the candidate correspondence. The correspondence fraud detection model may also be configured to generate, based on the set of correspondence faults, a fraud likelihood score associated with the candidate correspondence. In some embodiments, the fraud likelihood score may be employed by the correspondence fraud detection model to determine a respective authenticity category for the candidate correspondence. Based in part on the fraud likelihood score and/or the authenticity category, the correspondence fraud detection model may determine whether or not the candidate correspondence originated from an enterprise with which the user is associated. These and other operations executed by the correspondence fraud detection model will be described in greater detail herein below with reference to FIGS. 4-7.

It will be appreciated that, in some embodiments, one or more of the methods described herein may be executed with regard to authentic correspondence generated by a respective enterprise before the correspondence is delivered to one or more intended users. As such, the correspondence fraud detection system 102 may be employed to determine one or more correspondence faults and/or one or more correspondence inconsistencies associated with a respective piece of correspondence before the correspondence is transmitted to one or more users. For example, the correspondence fraud detection system 102 may detect one or more errors with various enterprise data (e.g., enterprise product data, enterprise contact data, etc.) comprised in authentic correspondence (e.g., printed correspondence, digital correspondence, and/or the like) generated by the enterprise. This provides the additional benefit of detecting one or more errors with a respective piece of correspondence before the correspondence is transmitted, thus preventing any potential confusion, distrust, and/or loss of integrity that may result from transmitting correspondence that comprises errors and/or inconsistencies to one or more users.

In some embodiments, the correspondence fraud detection system 102 further includes a storage device that comprises a distinct component from other components of the correspondence fraud detection system 102. The storage device may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Additionally or alternatively, the storage device may host the software executed to operate the correspondence fraud detection system 102. Additionally or alternatively, the storage device may store information relied upon during operation of the correspondence fraud detection system 102, such as various user data (e.g., user profile data, user account data, etc.), AI model training data, AI model input data, AI model output data, enterprise data (e.g., product and/or service data, distribution data, logistical data, legal data, software application framework data, etc.), and/or the like configured in various data formats to be utilized by the correspondence fraud detection system 102. In addition, the storage device may store control signals, device characteristics, and/or access credentials enabling interaction between the correspondence fraud detection system 102 and/or one or more of the enterprise computing devices 106A-106N or user devices 108A-108N.

In various embodiments, the one or more enterprise computing devices 106A-106N and/or the one or more user devices 108A-108N may be embodied by any computing devices known in the art. The one or more enterprise computing devices 106A-106N and/or the one or more user devices 108A-108N need not themselves be independent devices but may be peripheral devices communicatively coupled to other computing devices.

Example Implementing Apparatuses

Figure 2:
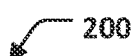
FIG. 2 illustrates a schematic block diagram of example circuitry embodying a system device that may perform various operations in accordance with some example embodiments described herein.
Figure 2:
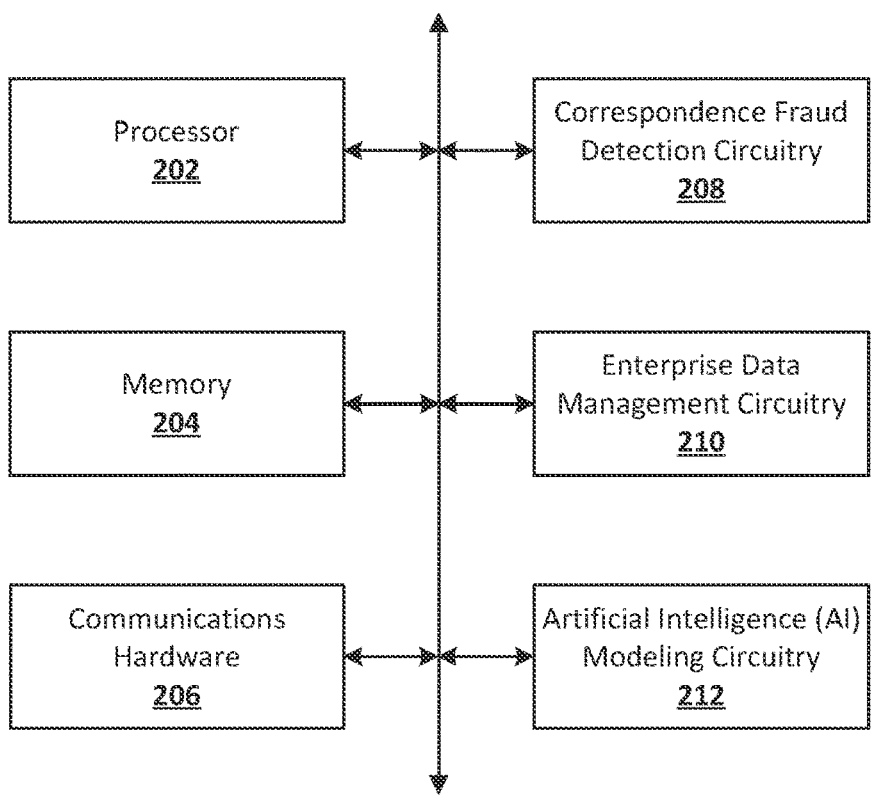

The correspondence fraud detection system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 2-7. As illustrated in FIG. 2, the apparatus 200 may include processor 202, memory 204, communications hardware 206, correspondence fraud detection circuitry 208, enterprise data management circuitry 210, and/or artificial intelligence (AI) modeling circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204, the storage device, or otherwise accessible to the processor. In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, and/or the like for enabling the apparatus 200 to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, software application instance (e.g., a mobile application), dedicated client device, or the like. In some embodiments, the communications hardware 206 may include a keyboard, a mouse, a touch screen, touch areas, soft keys, a microphone, a camera, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises correspondence fraud detection circuitry 208. In some embodiments, the correspondence fraud detection circuitry 208 may be configured to facilitate the execution of one or more correspondence fraud detection operations for an enterprise associated with the correspondence fraud detection system 102. Additionally, the correspondence fraud detection circuitry 208 may utilize processor 202, memory 204, or any other hardware component included in the apparatus 200 (e.g., one or more cameras, such as rear- and/or front-facing mobile phone cameras, web cameras, automated teller machine (ATM) cameras, and/or the like) to perform these operations, as described in connection with FIGS. 4-7 below.

In various embodiments, the correspondence fraud detection circuitry 208 may be configured to receive one or more portions of image input data representative of printed candidate correspondence. In some examples, the image input data representative of the printed candidate correspondence may be captured by a client computing device (e.g., user device 108A, web camera, smartphone, and/or other user devices) associated with a user. In various examples, the image input data representative of the printed candidate correspondence may include one or more portions of still image data (e.g., pixels, contour lines, color gradients, contrast regions, etc.) and/or one or more portions of video data (e.g., video frames, pixels, contour lines, color gradients, contrast regions etc.) captured with respect to the text, images, watermarks, logos, icons, correspondence authentication objects, and/or the like associated with the printed candidate correspondence.

The correspondence fraud detection circuitry 208 may further utilize the communications hardware 206 to gather data from, or transmit data to, a variety of sources (e.g., the enterprise computing devices 106A-106N, the user devices 108A-108N, social media networks, consumer banking servers, and/or any storage devices associated with the correspondence fraud detection system 102), and/or exchange data with a user. In some embodiments, the correspondence fraud detection circuitry 208 may work in conjunction with (e.g., may direct and/or otherwise manage) the enterprise data management circuitry 210 and/or the AI modeling circuitry 212 in order to execute one or more of the methods described herein. For example, in some embodiments, the correspondence fraud detection circuitry 208 may integrate with and/or otherwise leverage the AI modeling circuitry 212 to employ a correspondence fraud detection model to execute the various methods and operations described herein.

Furthermore, in various embodiments, the correspondence fraud detection circuitry 208 may be configured to leverage the processor 202, the memory 204, and/or the communications hardware 206 to generate, cause transmission of, and/or cause display of a plurality of interactive user interface elements on a user interface associated with a software application instance associated with the correspondence fraud detection system 102 on a user device 108A. The plurality of interactive user interface elements may be configured as one or more interactive text fields, buttons, selectable images, hyperlinks, radio buttons, sliders, embedded multimedia modules, charts, graphs, prompts, notifications, banners, instructions, and/or the like configured to initiate execution of one or more commands (e.g., executable software instructions) designed to facilitate the capture of one or more portions of user input including, but not limited to, the capture of one or more portions of image data related to printed candidate correspondence received by a user. For example, the correspondence fraud detection circuitry 208 may be configured to leverage a plurality of interactive user interface elements associated with the software application instance to facilitate the imaging and/or scanning of various printed correspondence received by a user by controlling, based on an interaction with the interactive user interface elements, an image capturing device (e.g., a rear-facing camera) of a user device (e.g., user device 108A) to facilitate the imaging and/or scanning of the printed correspondence.

Furthermore, the correspondence fraud detection circuitry 208 may be configured to leverage a plurality of interactive user interface elements in order to communicate (e.g., display) whether a respective candidate correspondence is fraudulent correspondence. For example, the correspondence fraud detection circuitry 208 may be configured to cause display of one or more correspondence fraud evaluations associated with the respective candidate correspondence on the user interface associated with the software application instance associated with the correspondence fraud detection system 102. In some example embodiments, the one or more correspondence fraud evaluations may comprise various data related to a fraud likelihood score, an authenticity category, one or more correspondence error and/or inconsistencies, and/or the like associated with the respective candidate correspondence.

Additionally, in some embodiments, the correspondence fraud detection circuitry 208 may utilize the processor 202, the memory 204, the communications hardware 206, and/or the AI modeling circuitry 212 to facilitate the decryption of one or more correspondence authentication objects associated with a respective candidate correspondence. Non-limiting examples of a correspondence authentication object may include a QR code, a data matrix, a barcode, a universal product code (UPC), a machine-readable code (MRC), a European article number (EAN), a databar, a codabar, and/or the like. In such example embodiments, the correspondence fraud detection circuitry 208 may facilitate the decryption of the one or more correspondence authentication objects in order to access correspondence identification information associated with the candidate correspondence.

Furthermore, the correspondence fraud detection circuitry 208 may work in conjunction with the AI modeling circuitry 212 to leverage the correspondence fraud detection model to match the correspondence identification information to one or more correspondence delivery records stored by a respective enterprise in order to determine whether the candidate correspondence is fraudulent or not. Further still, the correspondence fraud detection circuitry 208 may be configured to cause execution of various actions in response to decrypting the one or more correspondence authentication objects. As a non-limiting example, the correspondence fraud detection circuitry 208 may be configured to access one or more web links, cause transmission of one or more acknowledgement messages to or from a respective computing device (e.g., user device 108A, enterprise computing device 106A, etc.), cause transmission of various correspondence identification information, and/or the like based on decrypting the one or more correspondence authentication objects. These and other operations associated with the correspondence fraud detection circuitry 208 will be described in further detail herein below with reference to FIGS. 4-7.

In addition, the apparatus 200 further comprises enterprise data management circuitry 210 that may be configured to facilitate the management and/or utilization of various enterprise data associated with a respective enterprise by various components associated with the correspondence fraud detection system 102. The enterprise data management circuitry 210 may utilize processor 202, memory 204, or any other hardware component included in the apparatus 200 to perform these operations, as described in connection with FIGS. 4-7 below. The enterprise data management circuitry 210 may further utilize communications hardware 206 to gather data from a variety of sources (e.g., enterprise computing devices 106A-106N, user devices 108A-108N, and/or any storage devices associated with the correspondence fraud detection system 102), and/or exchange data with a user, and in some embodiments may utilize processor 202 and/or memory 204 to receive, retrieve, parse, process, store, update, delete, and/or otherwise manage one or more portions of enterprise data associated with a respective enterprise. In some embodiments, the enterprise data management circuitry 210 may work in conjunction with the correspondence fraud detection circuitry 208, and/or the AI modeling circuitry 212 in order to execute one or more of the methods described herein.

In various embodiments, the enterprise data management circuitry 210 may be configured to manage one or more portions of ground-truth data associated with a respective enterprise in order to facilitate one or more correspondence fraud detection operations described herein. In various embodiments, the ground-truth data associated with an enterprise may comprise data related to one or more enterprise correspondence style rules (e.g., text formatting rules related to specific fonts, text emphasis, text decorations, text styles, etc.), correspondence tone (e.g., a professional tone, formal tone, informal tone, etc.), enterprise branding rules (e.g., requirements associated with logos, slogans, letterhead, icons, lexicon usage, etc.), enterprise contact data (e.g., phone numbers, email addresses, physical addresses, personnel data, etc.), enterprise product data (e.g., current product information, service information, promotion information, offer information, etc.), user data (e.g., user profile data, user account data, user identification data, etc.), user data obfuscation rules (e.g., rules for displaying PII, account information, credit card number information, etc.), correspondence delivery records (e.g., intended recipient data, originating correspondence source data, delivery timestamp data, expected arrival time data, etc.), domain knowledge data (e.g., financial domain data, technology domain data, business domain data, etc.), library of forms data (e.g., known enterprise form letters, known correspondence configurations, known fraudulent correspondence, etc.), and/or the like. In various embodiments, the ground-truth data managed by the enterprise data management circuitry 210 may be associated with, affiliated with, provided by, and/or otherwise managed by a third-party entity with which the enterprise is associated (e.g., a third-party research institution, domain oversight institution, enterprise competitor, and/or the like).

In addition, the apparatus 200 further comprises AI modeling circuitry 212 that may be configured to integrate with, embody, direct, and/or otherwise manage a correspondence fraud detection model associated with the correspondence fraud detection system 102. The AI modeling circuitry 212 may utilize processor 202, memory 204, or any other hardware component included in the apparatus 200 to perform these operations, as described in connection with FIGS. 4-7 below. The AI modeling circuitry 212 may further utilize communications hardware 206 to gather data from a variety of sources (e.g., enterprise computing devices 106A-106N, user devices 108A-108N, and/or any storage devices associated with the correspondence fraud detection system

102), and/or exchange data with a user, and in some embodiments may utilize processor 202 and/or memory 204 to determine whether correspondence received by a respective user is authentic and/or originated from an enterprise with which the user is associated, or whether the correspondence is fraudulent (e.g., designed to unlawfully obtain sensitive data, PII associated with a user, user account data, and/or valuable resources from the user and/or enterprise). In some embodiments, the AI modeling circuitry 212 may work in conjunction with the correspondence fraud detection circuitry 208, and/or the enterprise data management circuitry 210 in order to execute one or more of the methods described herein.

In various embodiments, the AI modeling circuitry 212 may be configured to leverage a correspondence fraud detection model to extract correspondence content data from candidate correspondence received by a respective user (e.g., physically by mail or digitally by email, etc.). In various embodiments, the correspondence content data may include text data (e.g., text string data, text content, words, phrases, substring data, etc.), text placement data (e.g., paragraph styles, text placement and/or position relative to the overall document, etc.), text format data (e.g., fonts, emphasis, styles, etc.), image data (e.g., image placement, image content, etc.), correspondence authentication objects (e.g., QR codes, barcodes, watermarks, document identification codes, etc.). Additionally or alternatively, in embodiments in which the candidate correspondence is digital correspondence (e.g., email, SMS message, etc.), the correspondence content data extracted by the correspondence fraud detection model may further comprise hyperlink data (e.g., web address data), interactive user interface element data (e.g., HTML data, control element data (e.g., buttons, sliders, etc.)), image metadata, and/or the like.

The AI modeling circuitry 212 may be configured to leverage the correspondence fraud detection model to detect, based on extracted correspondence content data, a set of correspondence faults associated with the candidate correspondence. In various examples, the set of correspondence faults may comprise one or more language errors including, but not limited to, typographical errors (e.g., spelling errors, spurious character errors, etc.), missing word errors, grammatical errors, language use errors, and/or the like. Additionally or alternatively, the set of correspondence faults may comprise one or more correspondence inconsistencies that contradict one or more portions of ground-truth data related to one or more enterprise correspondence style rules, correspondence tones, enterprise branding rules, enterprise contact data, enterprise product data, user data, user data obfuscation rules, correspondence delivery records, domain knowledge data, library of forms data, and/or the like associated with a respective enterprise purported to have delivered the candidate correspondence.

Additionally, the AI modeling circuitry 212 may be configured to leverage the correspondence fraud detection model to generate, based on the set of correspondence faults, a fraud likelihood score associated with the candidate correspondence. In various embodiments, the fraud likelihood score associated with the candidate correspondence may be any numerical value within a predefined numerical range (e.g., a number between zero (0) and one (1)) and may indicate a probability that a respective piece of candidate correspondence is indeed fraudulent. The AI modeling circuitry 212 may be configured to leverage the correspondence fraud detection model to determine, based on a fraud likelihood score, an authenticity category for the respective piece of candidate correspondence. In various embodiments, the correspondence fraud detection system 102 may define any suitable number of authenticity categories configured to classify various candidate correspondence based on respective fraud likelihood scores. Non-limiting examples of authenticity categories associated with the correspondence fraud detection system 102 may include "authentic," "potentially fraudulent," and "fraudulent." Furthermore, the AI modeling circuitry 212 may be configured to leverage the correspondence fraud detection model to determine, based on an authenticity category associated with a respective piece of candidate correspondence, whether the candidate correspondence originated from an enterprise with which the user is associated. These and other operations associated with the AI modeling circuitry 212 will be described in further detail herein below with reference to FIGS. 4-7.

Although components 202-212 are described in part using functional language, it will be understood that the particular implementations necessarily include the use of particular hardware. It should also be understood that certain of these components 202-212 may include similar or common hardware. For example, the correspondence fraud detection circuitry 208, the enterprise data management circuitry 210, and/or the AI modeling circuitry 212 may each at times leverage use of the processor 202, memory 204, and/or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may, in addition, refer to software instructions that configure the hardware components of the apparatus 200 to perform the various functions described herein.

Although the correspondence fraud detection circuitry 208, the enterprise data management circuitry 210, and/or the AI modeling circuitry 212 may leverage processor 202, memory 204, and/or communications hardware 206 as described above, it will be understood that any of the correspondence fraud detection circuitry 208, the enterprise data management circuitry 210, and/or the AI modeling circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that the correspondence fraud detection circuitry 208, the enterprise data management circuitry 210, and/or the AI modeling circuitry 212 comprise particular machinery designed for performing the functions described herein in connection with such elements of apparatus 200.

Figure 3:
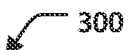
FIG. 3 illustrates a schematic block diagram of example circuitry embodying a user device that may perform various operations in accordance with some example embodiments described herein.
Figure 3:
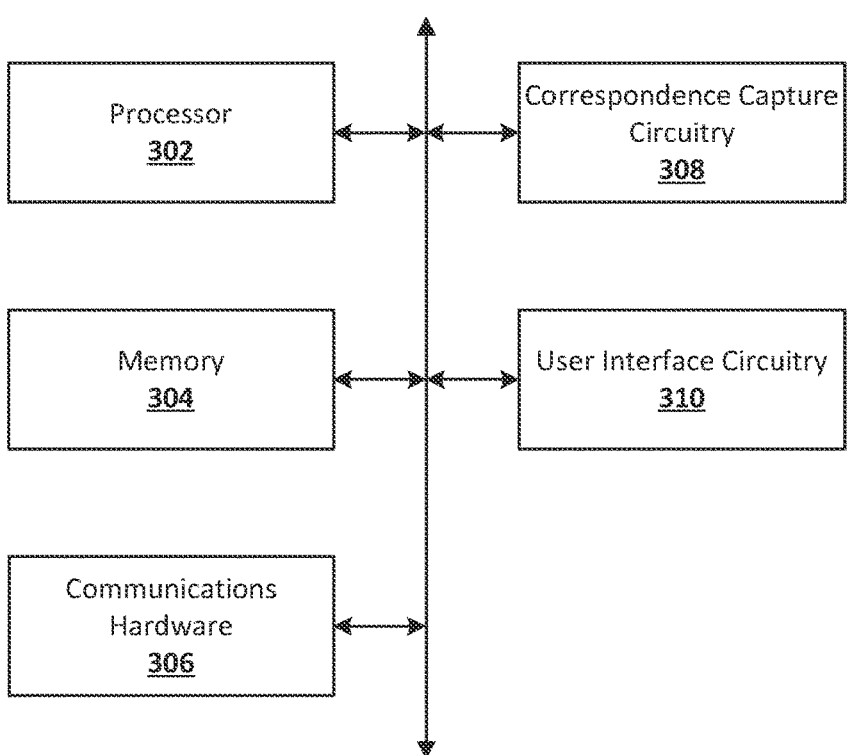

As illustrated in FIG. 3, an apparatus 300 is shown that represents an example enterprise computing device (e.g., any of enterprise computing devices 106A-106N) or an example user device (e.g., any of user devices 108A-108N). The apparatus 300 includes processor 302, memory 304, and communications hardware 306, each of which is configured to be similar to the similarly named components described above in connection with FIG. 2. Additionally, the apparatus 300 may also include correspondence capture circuitry 308, and/or user interface circuitry 310, each of which may be configured to facilitate the execution of the various methods described herein. For example, the correspondence capture circuitry 308, and/or the user interface circuitry 310 may be configured to generate, capture, aggregate, process, and/or otherwise manage one or more portions of candidate correspondence data received by a user and transmit the candidate correspondence data to the correspondence fraud detection system 102 in order to facilitate the execution of one or more of the methods described herein.

The correspondence capture circuitry 308 includes hardware components designed for capturing one or more portions of data related to candidate correspondence received by a respective user and/or causing transmission of the one or more portions of data related to candidate correspondence to the correspondence fraud detection system 102. In some embodiments, the correspondence capture circuitry 308 may utilize processor 302, memory 304, or any other hardware component included in the apparatus 300 to perform the operations described in connection with FIGS. 4-7 below. The correspondence capture circuitry 308 may comprise, embody, integrate with and/or otherwise control one or more image capture devices associated with a computing device (e.g., user device 108A, enterprise computing device 106A, etc.) such as, for example, one or more cameras (e.g., front- and/or rear-facing cameras, web cameras, ATM cameras, etc.) associated with one or more respective fields of view configured to capture image data and/or video data.

For example, the correspondence capture circuitry 308 may be configured to capture and/or scan image data representative of candidate correspondence received by a user by mail, hand-delivery, and/or the like. In some embodiments, the apparatus 300 may be configured as a user device (e.g., user device 108A) and the correspondence capture circuitry 308 may be configured to capture and/or scan image data representative of the candidate correspondence based on one or more interactions with a software application instance associated with the correspondence fraud detection system 102. For example, as described herein, a software application instance associated with the correspondence fraud detection system 102 may be configured to guide a user through one or more operations related to imaging and/or scanning data representative of the candidate correspondence via the various hardware components of the correspondence capture circuitry 308 associated with the user device (e.g., one or more cameras associated with a user device 108A).

As a non-limiting example, the correspondence capture circuitry 308 may be configured to facilitate the alignment of printed correspondence within the field-of-view of a camera (e.g., a rear-facing camera) embodied by a user device (e.g., user device 108A). For instance, the correspondence capture circuitry 308 may be configured to cause display of a digital representation of a frame, border, outline, and/or the like via the user interface of a software application instance associated with the correspondence fraud detection system 102 on an electronic display (e.g., touchscreen, liquid crystal display (LCD), etc.) of the user device (e.g., user device 108A). For example, in such embodiments, the correspondence capture circuitry 308 may overlay a digital representation of a frame atop a real time (or near-real time) video data feed being captured via the rear-facing camera of the user device, where the video data feed being captured is utilized to align the printed correspondence within the digital representation of the frame. Once aligned, the correspondence capture circuitry 308 may be configured to record, scan, capture, and/or otherwise record image data associated with the printed correspondence and cause transmission of the recorded image data to the correspondence fraud detection system 102 for processing (e.g., by the AI modeling circuitry 212).

In addition, the apparatus 300 may also include the user interface circuitry 310, which includes hardware components designed for receiving user inputs and/or rendering virtual graphics outputs. The user interface circuitry 310 may utilize processor 302, memory 304, or any other hardware component included in, or integrated with, the apparatus 300 to perform these operations, as described in connection with FIGS. 4-7 below. The user interface circuitry 310 may further utilize communications hardware 306 to transmit data representative of a user input and/or receive data to render as a virtual graphics output or may otherwise utilize processor 302 and/or memory 304 to generate data representative of a user input and/or generate virtual graphics output, e.g., from based on received data. The user interface circuitry 310 may comprise one or more of a keyboard, pointing device, touchscreen, microphone with speech recognition interface, one or more cameras, and/or one or more other input devices capable of receiving various different user inputs. In addition, the user interface circuitry 310 may comprise a display device including one or more of a screen with graphical user interface (GUI), speaker, light-emitting diode (LED) display, organic LED (OLED) display, LCD display, touchscreen, haptic technology device, and/or other output device capable of rendering information to a user. In this regard, the user interface circuitry 310 may be configured to facilitate the capture, generation, reception, transmission, and/or management of one or more portions of user input data, candidate correspondence data, and/or the like to be used for one or more correspondence fraud detection operations executed by the correspondence fraud detection system 102.

Additionally, the user interface circuitry 310 may utilize processor 302, memory 304, or any other hardware component included in, or integrated with, the apparatus 300 to run, host, configure, and/or otherwise execute one or more operations, instructions, and/or commands related to a software application instance associated with the correspondence fraud detection system 102. For example, the user interface circuitry 310 may be configured allow a user to interact with the correspondence fraud detection system 102 via the software application instance in order to facilitate one or more correspondence fraud detection operations and/or any of the other methods described herein.

In some embodiments, various components of the apparatuses 200 and 300 may be hosted remotely (e.g., by one or more cloud servers) and thus need not physically reside on the corresponding apparatus 200 or 300. For instance, some components of the apparatus 200 may not be physically proximate to the other components of apparatus 200. Similarly, some or all of the functionality described herein may be provided by third party circuitry. For example, a given apparatus 200, or 300, may access one or more third party circuitries in place of local circuitries for performing certain functions.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below in connection with a series of flowcharts.

Example Operations

Turning to FIGS. 4-7, example flowcharts are illustrated that contain example operations implemented by example embodiments described herein. The operations illustrated in FIGS. 4-7 may, for example, be performed by a system device (e.g., server, etc.) of the correspondence fraud detection system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, correspondence fraud detection circuitry 208, enterprise data management circuitry 210, AI modeling circuitry 212, and/or any combination thereof. It will be understood that user interaction with the correspondence fraud detection system 102 may occur directly via communications hardware 206, or may instead be facilitated by a separate computing device (e.g., any of enterprise computing devices 106A-106N, and/or user devices 108A-108N shown in FIG. 1, which may in turn be embodied by an apparatus 300, which is shown and described in connection with FIG. 3), and which may have similar or equivalent physical componentry facilitating such user interaction.

Figure 4:
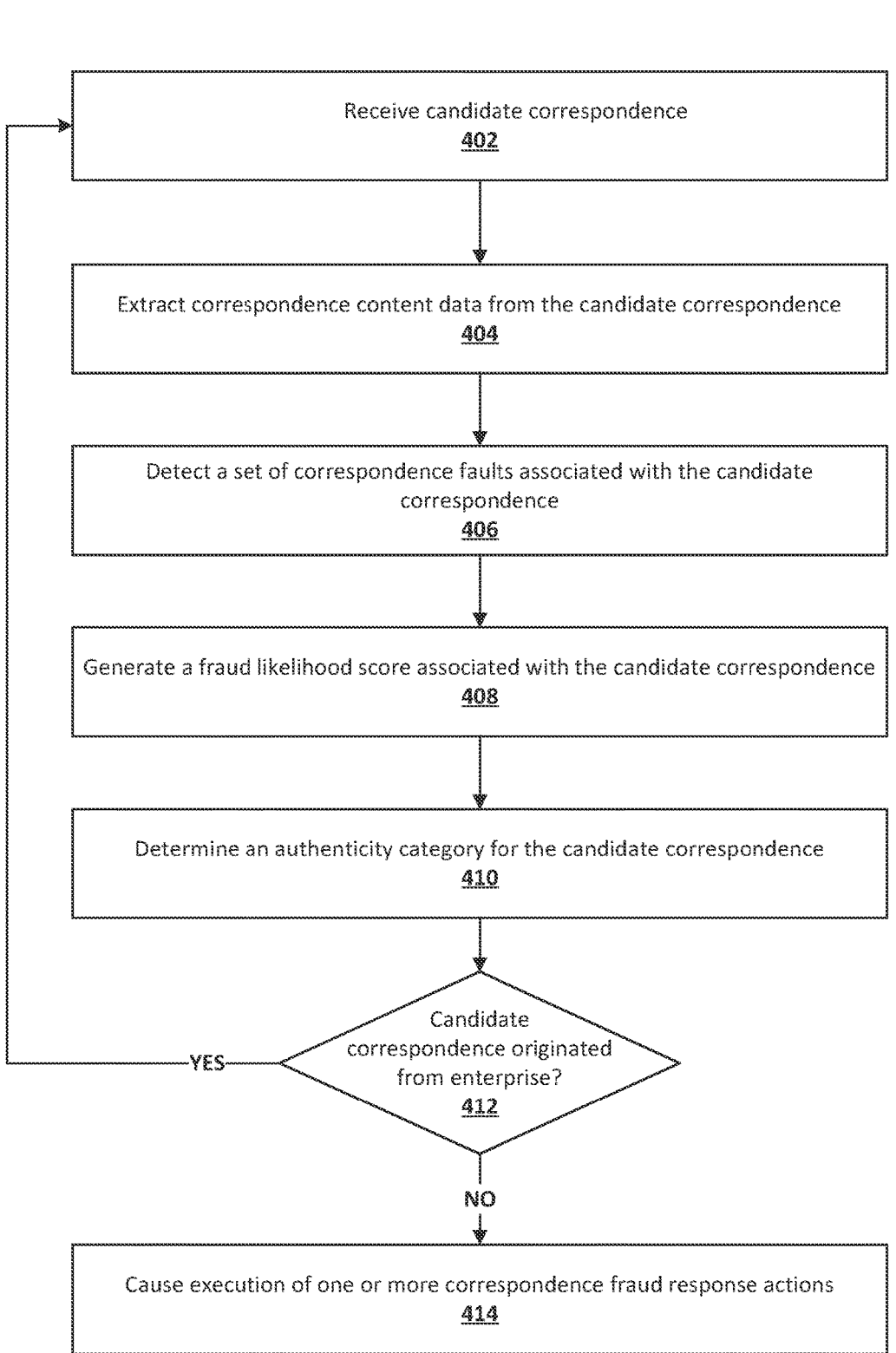
FIG. 4 illustrates an example dataflow diagram for dynamically detecting correspondence fraud in accordance with some example embodiments described herein.

Turning first to FIG. 4, flowchart 400 illustrates example operations for dynamically detecting correspondence fraud.

As shown by operation 402, the apparatus 200 may include means, such as processor 202, memory 204, communications hardware 206, correspondence fraud detection circuitry 208, and/or the like for receiving candidate correspondence associated with a user. As described herein, in some examples, candidate correspondence may be digital correspondence (e.g., email, SMS messages, notifications, etc.) received by a user via a user device (e.g., user device 108A). Such digital candidate correspondence may be received by the user device by way of any suitable network communication platform such as an email platform, phone network, and/or any software-based communications platform capable of integrating with the user device associated with the user.

In various embodiments, the communications hardware 206 may be configured to receive such digital candidate correspondence associated with the user via the communications network 104. For instance, in some embodiments, a software application instance associated with the correspondence fraud detection system 102 running on a user device (e.g., user device 108A) may be configured to facilitate the submission of one or more pieces of digital candidate correspondence configured as an email, SMS message, notification, and/or the like. As a non-limiting example, a user may receive digital correspondence (e.g., an email) that appears to be from an enterprise with which the user is associated and may subsequently submit the digital correspondence to the correspondence fraud detection system 102 for authentication via the software application instance. In this regard, the correspondence fraud detection system 102 may be configured to facilitate the submission and/or reception of candidate correspondence that is configured in various data formats including, but not limited to, email file formats, SMS message formats, portable document format (PDF) file format, word processing software document formats, image formats, source code file formats, video file formats, audio file formats, and/or any appropriate data format used to configure various types of correspondence.

Additionally or alternatively, as described herein, candidate correspondence may be printed correspondence directed to the user that is received in the mail or hand-delivered to the user directly. Non-limiting examples of such candidate correspondence may include letters, direct mail (e.g., flyers, mailers, etc.), memos, brochures, reports, advertisements, postcards, notices, directives, communications, and/or the like that are printed and/or hand-written and directed to (e.g., addressed to) the user. In this regard, the correspondence fraud detection system 102 may be configured to facilitate the generation of candidate correspondence that is a digital representation of one or more pieces of printed correspondence. For example, in various embodiments and as described herein, the correspondence fraud detection circuitry 208 may be configured to leverage a plurality of interactive user interface elements associated with a software application instance associated with the correspondence fraud detection system 102 to facilitate the imaging and/or scanning of various printed correspondence received by a user by controlling, based on an interaction with the interactive user interface elements, an image capturing device (e.g., a rear-facing camera) of a user device (e.g., user device 108A) to facilitate the imaging and/or scanning of the printed correspondence.

As shown by operation 404, the apparatus 200 may include means, such as processor 202, memory 204, AI modeling circuitry 212, and/or the like for extracting correspondence content data from the candidate correspondence. As described herein, correspondence content data may include text data (e.g., text string data, text content, words, phrases, substring data, etc.), text placement data (e.g., paragraph styles, text placement and/or position relative to the overall document, etc.), text format data (e.g., fonts, emphasis, styles, etc.), image data (e.g., image placement, image content, etc.), correspondence authentication objects (e.g., QR codes, barcodes, watermarks, identification codes, etc.). Additionally or alternatively, in embodiments in which the candidate correspondence is digital correspondence (e.g., email, SMS message, etc.), the correspondence content data extracted by the correspondence fraud detection model may further comprise hyperlink data (e.g., web address data), interactive user interface element data (e.g., HTML data, control element data (e.g., buttons, sliders, etc.)), image metadata, and/or the like.

In various embodiments, the AI modeling circuitry 212 may be configured to leverage a correspondence fraud detection model to process and/or extract various features and correspondence content data from candidate correspondence. For example, the correspondence fraud detection model may be configured to employ one or more NLP, OCR, and/or image recognition techniques to extract correspondence content data from candidate correspondence associated with a respective user. In circumstances in which the candidate correspondence is directed to a respective user, the AI modeling circuitry 212 may be configured to leverage the correspondence fraud detection model to detect, extract, evaluate, and/or otherwise process user data (e.g., PII, user account data, etc.) comprised within the correspondence content data. As a non-limiting example, the correspondence fraud detection model may be configured to detect a 16-digit user account number associated with the user within the correspondence content data, and that the last five digits of the user account number have been preceded by eleven placeholder characters (e.g., "***********12345").

In some embodiments, the correspondence fraud detection model may be trained to detect boundaries for various candidate content data such that it may identify the content data. The boundaries for the candidate content data may be dependent upon the type of candidate correspondence (e.g., physical mail, email, or the like). In some embodiments, the correspondence fraud detection model may be trained using supervised learning protocols. In particular, a training corpus may include training correspondences of various types. Each training correspondence may be labelled with correspondence content data indicative of the boundaries for the given correspondence content data. For example, a training correspondence that is an email may include a greeting, multiple text paragraphs, a sign off, a sign-off signature, a QR code, and a hyperlink. The training correspondence may be labelled to indicate the boundaries for each of these elements, such as by using a color-coded box or other designator. The training correspondences in the training corpus may be provided to the correspondence fraud detection model such that the correspondence fraud detection model may be trained to determine the boundaries for various correspondence content data and, subsequently, identify the correspondence content data within a candidate correspondence.

Additionally or alternatively, the AI modeling circuitry 212 may be configured to leverage the correspondence fraud detection model to detect, extract, evaluate, and/or otherwise process enterprise data comprised within the correspondence content data. As a non-limiting example, the correspondence fraud detection model may be configured to determine that the candidate correspondence comprises information that is allegedly related to one or more offers, products, and/or services associated with an enterprise. For example, the candidate correspondence may comprise a "special offer" directed towards a respective user based on the merits of the user, a type of account or service the user has subscribed to in the past, and/or because the user has "earned" said special offer by way of their behavior. As another example, the candidate correspondence may comprise information related to an available product or service offered by the enterprise for which the user may take advantage if the user responds to the candidate correspondence in a correct manner. In some embodiments, the correspondence fraud detection model may be trained to utilize one or more NLP techniques, such as term frequency-inverse document frequency (TF-IDF), bag of words (BoW), embedding techniques (e.g., Word2Vec, global vectors for word representation (GloVe), FastText, or the like), n-gram techniques, name entity recognition (NER) techniques, and/or the like). In this way, the correspondence fraud detection model may be trained to infer the context and use of certain terms and/or phrases within text.

As another non-limiting example, the correspondence fraud detection model may be configured to determine that the candidate correspondence comprises one or more instructions, suggested actions, required actions, recommendations, and/or calls-to-action that an enterprise has allegedly advised a respective user to execute. For example, the candidate correspondence may inform the user that an adverse situation has occurred (e.g., a situation in which the user has allegedly made a mistake (e.g., overdrawn a bank account), a situation in which sensitive data associated with the user has been exploited (e.g., a user account has been hacked, a credit card number has been use without authorization), and/or the like), and that the user must take immediate action to remedy the adverse situation.

As shown by operation 406, the apparatus 200 may include means, such as processor 202, memory 204, enterprise data management circuitry 210, AI modeling circuitry 212, and/or the like for detecting, based on the correspondence content data, a set of correspondence faults associated with the candidate correspondence. For example, the AI modeling circuitry 212 may be configured to leverage the correspondence fraud detection model to parse, analyze, evaluate, and/or otherwise process the correspondence content data in order to detect the set of correspondence faults comprised in the candidate correspondence. In various embodiments, a set of correspondence faults may comprise one or more language errors including, but not limited to, typographical errors (e.g., spelling errors, spurious character errors, etc.), missing word errors, grammatical errors, language use errors, and/or the like.

Additionally or alternatively, the AI modeling circuitry 212 may be configured to work in conjunction with the enterprise data management circuitry 210 to leverage the correspondence fraud detection model to detect a set of correspondence faults that comprises one or more correspondence inconsistencies. In various embodiments, the one or more correspondence inconsistencies may be errors that contradict one or more portions of ground-truth data related to one or more enterprise correspondence style rules (e.g., text formatting rules related to specific fonts, text emphasis, text decorations, text styles, etc.), correspondence tone (e.g., a professional tone, formal tone, informal tone, etc.), enterprise branding rules (e.g., requirements associated with logos, slogans, letterhead, icons, lexicon usage, etc.), enterprise contact data (e.g., phone numbers, email addresses, physical addresses, personnel data, etc.), enterprise product data (e.g., current product information, service information, promotion information, offer information, etc.), user data (e.g., user profile data, user account data, user identification data, etc.), user data obfuscation rules (e.g., rules for displaying PII, account information, credit card number information, etc.), correspondence delivery records (e.g., intended recipient data, originating correspondence source data, delivery timestamp data, expected arrival time data, etc.), domain knowledge data (e.g., financial domain data, technology domain data, business domain data, etc.), library of forms data (e.g., known enterprise form letters, known correspondence configurations, known fraudulent correspondence, etc.), and/or the like. Further details related to the execution of operation 406 will be described herein below with reference to FIG. 5.

As shown by operation 408, the apparatus 200 may include means, such as processor 202, memory 204, AI modeling circuitry 212, and/or the like for generating a fraud likelihood score associated with the candidate correspondence. The fraud likelihood score associated with a respective candidate correspondence may be a numerical value representing a probability of certainty that the respective candidate correspondence is fraudulent, counterfeit, intentionally misleading, untrustworthy, and/or the like. In various embodiments, the AI modeling circuitry 212 may be configured to leverage the correspondence fraud detection model to generate a fraud likelihood score based at least in part on a set of correspondence faults associated with a respective candidate correspondence associated with a user.

In various examples, the fraud likelihood score is generated based on one or more factors associated with the set of correspondence faults including, but not limited to, the number of language errors and/or correspondence inconsistencies in the set of correspondence faults, the types of language errors and/or correspondence inconsistencies in the set of correspondence faults, and/or the severity of the language errors and/or correspondence inconsistencies in the set of correspondence faults. For example, the number of errors detected in a candidate correspondence by the correspondence fraud detection model may impact the respective fraud likelihood score. In some embodiments, the fraud likelihood score may scale with the number of language errors and/or correspondence inconsistencies in the set of correspondence faults, where a large number of language errors and/or correspondence inconsistencies may cause the fraud likelihood score to increase.

Additionally or alternatively, the types of language errors and/or correspondence inconsistencies detected in a candidate correspondence by the correspondence fraud detection model may impact the respective fraud likelihood score. In this regard, the correspondence fraud detection model may be configured to determine and/or assign respective correspondence fault severity weights to the various types of language errors and/or correspondence inconsistencies detected in a candidate correspondence. A correspondence fault severity weight may be a numerical value representing the severity, criticality, importance, and/or impact of a particular type of language error or correspondence inconsistency and may be employed by the correspondence fraud detection model to adjust, augment, and/or otherwise determine the fraud likelihood score for a respective candidate correspondence.

For example, the correspondence fraud detection model may assign a first correspondence fault severity weight to a first language error associated with a grammatical error detected in candidate correspondence and a second correspondence fault severity weight to a second language error associated with a typographical error detected in the candidate correspondence. In various embodiments, the first correspondence fault severity weight related to the first language error associated with the grammatical error may be associated with a lower numerical value relative to the numerical value associated with the second language error associated with the correspondence fault severity weight related to the typographical error. In such an example, the correspondence fraud detection model may place more importance on the typographical error (e.g., assign a higher correspondence fault severity weight) than the grammatical error, as the presence of typographical errors in correspondence is commonly understood to be an indication that the correspondence is inauthentic. However, in some embodiments, the correspondence fraud detection system 102 may be configured to assign correspondence fault severity weights to various types of language errors and/or correspondence inconsistencies based on one or more preferences associated with an enterprise by which the correspondence fraud detection system 102 is employed. For example, based on the preferences associated with a respective enterprise, the correspondence fraud detection system 102 may assign a higher relative correspondence fault severity weight to a grammatical error and a lower relative correspondence fault severity weight to a typographical error and/or missing word error.

Similarly, the correspondence fraud detection model may assign various correspondence fault severity weights to various respective correspondence inconsistencies detected in candidate correspondence. As a non-limiting example, the correspondence fraud detection model may assign a first correspondence fault severity weight to a first correspondence inconsistency associated with an enterprise correspondence style rule (e.g., text formatting rule, text emphasis rule, text style rule, etc.) detected in candidate correspondence and assign a second correspondence fault severity weight to a second correspondence inconsistency associated with a user data obfuscation rule (e.g., a rule for displaying PII, account information, etc. associated with a user) detected in the candidate correspondence. In various embodiments, the first correspondence fault severity weight related to the enterprise correspondence style rule may be associated with a lower numerical value relative to the numerical value associated with the second correspondence fault severity weight related to the user data obfuscation rule. In such an example, the correspondence fraud detection model may place more importance on the correspondence inconsistency associated with the user data obfuscation rule (e.g., assign a higher correspondence fault severity weight) than the correspondence inconsistency associated with the enterprise correspondence style rule, as the presentation and proper obfuscation of user data is associated with a higher security risk. Further details regarding correspondence inconsistencies that contradict enterprise guidelines, ground-truth data, and/or the like will be described in greater detail herein below with reference to FIG. 5.

Furthermore, a fraud likelihood score associated with a candidate correspondence may be further impacted based on a determination that a there is a combination of language errors and/or correspondence inconsistencies comprised in the set of correspondence faults associated with the candidate correspondence. In this regard, the correspondence fraud detection model may generate and/or augment (e.g., increase) a fraud likelihood score based on detecting multiple of a same type of a language error and/or correspondence inconsistency within a single candidate correspondence. Additionally or alternatively, the correspondence fraud detection model may generate and/or augment (e.g., increase) a fraud likelihood score based on detecting multiple types of language errors and/or correspondence inconsistencies within a single candidate correspondence. For example, in some embodiments, the fraud likelihood score associated with a first candidate correspondence comprising a single language error (e.g., a grammatical error) may be relatively lower than a second candidate correspondence comprising multiple language errors of the same type (e.g., multiple grammatical errors). Additionally or alternatively, in some embodiments, the fraud likelihood score associated with a first candidate correspondence comprising a single type of language error (e.g., one or more grammatical errors) may be relatively lower than a second candidate correspondence comprising multiple types of language errors (e.g., a grammatical error and a typographical error).

In this regard, in various embodiments, the AI modeling circuitry 212 may be configured to leverage the correspondence fraud detection model to determine a total number of correspondence faults in a set of correspondence faults associated with a candidate correspondence. In some embodiments, determining the total number of correspondence faults comprises determining a number of types of correspondence faults (e.g., types of language errors and/or types of correspondence inconsistencies). The AI modeling circuitry 212 may be further configured to leverage the correspondence fraud detection model to determine a correspondence fault severity weight for each correspondence fault in the set of correspondence faults. Furthermore, the AI modeling circuitry 212 may be configured to leverage the correspondence fraud detection model to generate a fraud likelihood score associated with the candidate correspondence based at least in part on the total number of correspondence faults and the correspondence fault severity weights associated with the set of correspondence faults. Further details related to operation 408 and the generation of the fraud likelihood score will be described herein with reference to FIGS. 6 and 7.

As shown by operation 410, the apparatus 200 may include means, such as processor 202, memory 204, AI modeling circuitry 212, and/or the like for determining an authenticity category for the candidate correspondence. For example, the AI modeling circuitry 212 may be configured to leverage the correspondence fraud detection model to determine an authenticity category for the candidate correspondence based in part on the fraud likelihood score generated for the candidate correspondence based on the set of detected correspondence faults. In this regard, the AI modeling circuitry 212 may be configured to determine if the fraud likelihood score satisfies one or more authenticity category thresholds associated with one or more respective authenticity categories. Non-limiting examples of authenticity categories may include "authentic," "potentially fraudulent," and "fraudulent."

For example, the AI modeling circuitry 212 may determine if a fraud likelihood score (e.g., a numerical value or the like) satisfies a respective authenticity category threshold (e.g., a numerical value or the like). The fraud likelihood score may satisfy the respective authenticity category threshold if the fraud likelihood score is greater than or equal to the respective authenticity category threshold (e.g., to within an error value of ±1%, ±5%, or any other number). In other examples, the fraud likelihood score (e.g., a numerical value or the like) may satisfy the respective authenticity category threshold (e.g., a numerical value or the like) if the fraud likelihood score is less than or equal to the respective authenticity category threshold (e.g., to within an error value of ±1%, ±5%, or any other number).

As shown by operation 412, the apparatus 200 may include means, such as processor 202, memory 204, correspondence fraud detection circuitry 208, AI modeling circuitry 212, and/or the like for determining whether the candidate correspondence originated from an enterprise with which the user is associated. For example, the AI modeling circuitry 212 may be configured to determine whether the candidate correspondence is indeed authentic and/or originated from an enterprise with which the user is associated based in part on the authenticity category. Additionally or alternatively, the AI modeling circuitry 212 may be configured to determine whether the candidate correspondence is indeed authentic and/or originated from an enterprise with which the user is associated based in part on the fraud likelihood score associated with the candidate correspondence.

In various embodiments, if the AI modeling circuitry 212 (e.g., in conjunction with the correspondence fraud detection model) determines that the candidate correspondence is authentic and/or did originate from the enterprise (e.g., has been classified as authentic), the AI modeling circuitry 212 may be configured to cause the communications hardware 206 to provide a correspondence fraud evaluation, where the correspondence fraud evaluation comprises an indication of the authenticity category of the candidate correspondence. For example, if the AI modeling circuitry 212 determines that the candidate correspondence is authentic and/or did originate from the enterprise (e.g., has been classified as authentic), the correspondence fraud evaluation may notify the user that the candidate correspondence is safe, and the method associated with the flowchart 400 may revert to operation 402. In some embodiments, the correspondence fraud detection circuitry 208 may be configured to generate and/or cause transmission (e.g., by way of the communications hardware 206) of one or more notifications, alerts, banners, messages, and/or the like associated with the correspondence fraud evaluation to a user device (e.g., user device 108A). The one or more notifications, alerts, banners, messages, and/or the like associated with the correspondence fraud evaluation may be configured to inform the user that the candidate correspondence is authentic and/or may be engaged with (e.g., responded to) safely. Alternatively, if the AI modeling circuitry 212 (e.g., in conjunction with the correspondence fraud detection model) determines that the candidate correspondence is not authentic and/or did not originate from the enterprise (e.g., has been classified as "potentially fraudulent" or "fraudulent"), the AI modeling circuitry 212 may be configured to proceed to operation 414 of the flowchart 400.

As shown by operation 414, the apparatus 200 may include means, such as processor 202, memory 204, communications hardware 206, correspondence fraud detection circuitry 208, AI modeling circuitry 212, and/or the like for causing execution of one or more correspondence fraud response actions. For example, the AI modeling circuitry 212, in conjunction with the correspondence fraud detection circuitry 208, may be configured to cause execution of one or more correspondence fraud response actions based on determining that the candidate correspondence is not authentic and/or did not originate from an enterprise with which the user is associated.

For example, in response to determining that the candidate correspondence is fraudulent or potentially fraudulent (e.g., the candidate correspondence is classified with a "fraudulent" or "potentially fraudulent" authenticity category), the AI modeling circuitry 212 may cause the generation of a correspondence fraud evaluation configured to inform the user that the candidate correspondence is unauthentic, fraudulent, and/or may not be safely engaged with (e.g., responded to). In some embodiments, the correspondence fraud detection circuitry 208 may be configured to generate and/or cause transmission (e.g., by way of the communications hardware 206) of one or more notifications, alerts, banners, messages, and/or the like associated with the correspondence fraud evaluation to a user device (e.g., user device 108A).

Additionally or alternatively, in response to determining that the candidate correspondence is fraudulent or potentially fraudulent (e.g., the candidate correspondence is classified with a "fraudulent" or "potentially fraudulent" authenticity category), the AI modeling circuitry 212 may cause the generation of one or more suspected fraudulent correspondence alerts. In various embodiments, a suspected fraudulent correspondence alert may be a notification, warning, and/or the like configured in a number of different formats (e.g., email, SMS message, banner alert, etc.) and transmitted (e.g., via communications hardware 206) to one or more computing devices associated with the correspondence fraud detection system 102 (e.g., one or more enterprise computing devices 106A-106N, and/or the like).

Furthermore, in some embodiments, the correspondence fraud detection circuitry 208 may cause the generation, storage, and/or transmission of data related to the fraudulent correspondence. For example, the correspondence fraud detection circuitry 208 may cause the storage of one or more of correspondence content data, correspondence fault data, fraud likelihood score data, authenticity category data, correspondence identification information, correspondence source data (e.g., identifying data, address data, computing device data, and/or the like related to the sender of the candidate correspondence), user data (e.g., data related to the recipient of the candidate correspondence), and/or the like associated with candidate correspondence that has been classified as fraudulent by the correspondence fraud detection model. In various embodiments, said data associated with the fraudulent correspondence may be employed by the AI modeling circuitry 212 to train or re-train the correspondence fraud detection model associated with the correspondence fraud detection system 102.

Additionally or alternatively, the correspondence fraud detection circuitry 208 may cause the generation and/or transmission of one or more reports describing the fraudulent correspondence. In some embodiments, the one or more reports describing the fraudulent correspondence may comprise one or more portions of the correspondence content data, correspondence fault data, fraud likelihood score data, authenticity category data, correspondence identification information, correspondence source data, user data, and/or the like associated with candidate correspondence. The correspondence fraud detection circuitry 208 may cause the transmission of the one or more reports to one or more central entities responsible for monitoring, managing, mitigating, and/or otherwise tracking fraud attempts related to a particular domain with which the corresponding enterprise is associated (e.g., a central entity for mitigating fraud in the financial domain (e.g., credit card fraud, bank fraud, impersonation fraud, phishing, etc.).

Turning now to FIG. 5, example operations are shown for detecting correspondence inconsistencies in a candidate correspondence received by a respective user. As described herein, FIG. 5 illustrates some example implementations of operation 406 described herein with reference to FIG. 4.

As shown by operation 502, the apparatus 200 may include means, such as processor 202, memory 204, enterprise data management circuitry 210, AI modeling circuitry 212, and/or the like for comparing (e.g., matching) correspondence content data associated with the candidate correspondence to ground-truth data associated with an enterprise with which the candidate correspondence is purported to have originated from. In some examples, the AI modeling circuitry 212 may leverage the enterprise data management circuitry 210 to facilitate the comparison (e.g., matching) of correspondence content data to the ground-truth data associated with the respective enterprise.

As described herein, the ground-truth data associated with an enterprise may comprise data related to one or more enterprise correspondence style rules (e.g., text formatting rules related to specific fonts, text emphasis, text decorations, text styles, etc.), correspondence tone (e.g., a professional tone, formal tone, informal tone, etc.), enterprise branding rules (e.g., requirements associated with logos, slogans, letterhead, icons, lexicon usage, etc.), enterprise contact data (e.g., phone numbers, email addresses, physical addresses, personnel data, etc.), enterprise product data (e.g., current product information, service information, promotion information, offer information, etc.), user data (e.g., user profile data, user account data, user identification data, etc.), user data obfuscation rules (e.g., rules for displaying PII, account information, credit card number information, etc.), correspondence delivery records (e.g., intended recipient data, originating correspondence source data, delivery timestamp data, expected arrival time data, etc.), domain knowledge data (e.g., financial domain data, technology domain data, business domain data, etc.), library of forms data (e.g., known enterprise form letters, known correspondence configurations, known fraudulent correspondence, etc.), and/or the like. In various embodiments, the ground-truth data managed by the enterprise data management circuitry 210 may be associated with, affiliated with, provided by, and/or otherwise managed by a third-party entity with which the enterprise is associated (e.g., a third-party research institution, domain oversight institution, enterprise competitor, and/or the like).

As shown by operation 504, the apparatus 200 may include means, such as processor 202, memory 204, correspondence fraud detection circuitry 208, enterprise data management circuitry 210, AI modeling circuitry 212, and/or the like for detecting one or more correspondence inconsistencies associated with the candidate correspondence. In various embodiments, a correspondence inconsistency may be a type of correspondence fault detected by the correspondence fraud detection model based on the correspondence content data associated with the candidate correspondence. A correspondence inconsistency may be a contradiction and/or error related to one or more portions of ground-truth data associated with an enterprise with which the candidate correspondence is purported to have originated from.

In some examples, a correspondence inconsistency may be a contradiction and/or error related to one or more enterprise correspondence style rules, correspondence tones, and/or enterprise branding rules associated with the respective enterprise. In various embodiments, a respective enterprise may have established requirements related to how correspondence is generated and/or presented to new and/or existing users. As a non-limiting example, the AI modeling circuitry 212 may be configured to leverage the correspondence fraud detection model to determine that an incorrect font has been used for the text in the candidate correspondence. As another non-limiting example, the correspondence fraud detection model may determine that an incorrect text style and/or emphasis has been used in the candidate correspondence (e.g., particular portions of the candidate correspondence have been incorrectly emboldened, italicized, underlined, and/or the like). As another non-limiting example, the correspondence fraud detection model may determine that an incorrect tone has been used in the candidate correspondence (e.g., an overly candid, unprofessional tone may have been used in the body of the candidate correspondence). As another non-limiting example, the correspondence fraud detection model may determine incorrect usage of an enterprise-approved lexicon in the candidate correspondence (e.g., a lack of enterprise keywords or vocabulary, misuse of enterprise keywords or vocabulary, and/or the like). As another non-limiting example, the correspondence fraud detection model may determine an error and/or inconsistency in a slogan associated with the enterprise in the candidate correspondence (e.g., a misquote, error, and/or the like associated with an enterprise slogan and/or enterprise branding campaign).

In some examples, a correspondence inconsistency may be a contradiction and/or error related to one or more user data obfuscation rules associated with the respective enterprise. In various embodiments, a respective enterprise may have established requirements related to how user data is displayed and/or referenced in various correspondence. As a non-limiting example, a respective enterprise may employ a user data obfuscation rule that requires that the last five digits of a 16-digit user account number associated with a respective user be preceded by eleven placeholder characters (e.g., "***********12345") when referenced in correspondence. In such an embodiment, the correspondence fraud detection model may detect that an inappropriate number of placeholder characters has been used to obfuscate a user account number (e.g., the candidate correspondence may display the last four digits of a user account number rather than the expected five digits). Similar correspondence inconsistencies may pertain to the expected obfuscation of PII related to a user in correspondence including, but not limited to, contact information (e.g., phone numbers, email addresses, physical mailing addresses, etc.), information related to other parties associated with the user (e.g., beneficiaries, dependents, spouses, etc.), other account information (e.g., bank account balances, user profile identifiers, etc.), and/or the like.

In some examples, a correspondence inconsistency may be a contradiction and/or error related to user data associated with a respective user. For example, the enterprise data management circuitry 210 may be configured to receive, process, and/or otherwise manage user data related to one or more of user profile data (e.g., contact information, biological information, demographic information, etc.), user account data (e.g., account numbers, account status, bank account balance, account types, etc.), user identification data (e.g., PII), historical transaction data (e.g., purchase history data, subscription data, etc.), and/or the like associated with a respective user. As such, the AI modeling circuitry 212 may be configured to leverage the correspondence fraud detection model to determine one or more inconsistencies and/or errors associated with various user data comprised in the candidate correspondence. As a non-limiting example, the correspondence fraud detection model may detect an error related to an account number associated with the user (e.g., the last four digits of a displayed account number are incorrect) in the candidate correspondence. As another non-limiting example, the correspondence fraud detection model may detect one or more errors related to alleged account activity (e.g., alleged unauthorized purchases, historical transactions, expired bank cards, etc.) in the candidate correspondence.

In various examples, a correspondence inconsistency may be a contradiction and/or error related to enterprise product data associated with the respective enterprise. For example, the enterprise data management circuitry 210 may be configured to manage data related to each product, service, promotion, offer, deal, and/or the like currently being offered by the respective enterprise. As such, in various embodiments, the correspondence fraud detection model may determine there is one or more correspondence inconsistencies in the candidate correspondence if data related to outdated promotions, unoffered products and/or services, incorrect service terms, non-existent offers, incomplete product details, and/or the like are detected in the candidate correspondence. Furthermore, in various examples, a correspondence inconsistency may be a contradiction and/or error related to enterprise contact data associated with the respective enterprise. For example, the enterprise data management circuitry 210 may be configured to manage data related to one or more phone numbers, email addresses, physical addresses, and/or portions of personnel data associated with the enterprise. As such, in various embodiments, the correspondence fraud detection model may determine there is one or more correspondence inconsistencies in the candidate correspondence if incorrect data related to enterprise contact data is detected in the candidate correspondence.

In some examples, a correspondence inconsistency may be a contradiction and/or error related to one or more enterprise branding objects (e.g., image objects) associated with the respective enterprise. In various embodiments, a respective enterprise may have established requirements related to how certain branding objects are presented to new and/or existing users. In this regard, the AI modeling circuitry 212 may be configured to employ one or more image recognition techniques to analyze various logos, emblems, labels, imprints, signatures, stamps, trademarks, hallmarks, watermarks, icons, letterheads, badges, images, and/or any other branding objects comprised within the candidate correspondence. As such, the correspondence fraud detection model may be configured to compare (e.g., match) one or more branding objects detected in the candidate correspondence to one or more known branding objects associated with the respective enterprise. As a non-limiting example, the AI modeling circuitry 212 may be configured to leverage the correspondence fraud detection model to determine that an old (e.g., outdated, retired) logo was used in the candidate correspondence that does not match a current logo associated with the enterprise. As another non-limiting example, the correspondence fraud detection model may be configured to determine that one or more colors associated with one or more branding objects detected in the candidate correspondence does not match a known (e.g., current) color scheme associated with the enterprise.

In various examples, a correspondence inconsistency may be a contradiction and/or error related to domain knowledge data related to a domain with which the enterprise is associated (e.g., the financial domain). For example, the enterprise data management circuitry 210 may be configured to receive, process, and/or otherwise manage data related to one or more known technologies, statistics, trends, statuses, grades, rates, figures of merit, and/or the like associated with the domain for which the enterprise is associated. As such, the AI modeling circuitry 212 may be configured to leverage the correspondence fraud detection model to determine one or more inconsistencies and/or errors associated with various domain knowledge data comprised in the candidate correspondence. As a non-limiting example, for an enterprise associated with the financial domain, the correspondence fraud detection model may detect incorrect data related to current interest rates, mortgage rates, savings interest rates, credit card interest rates, and/or any other current statistics, trends, rates, and/or the like associated with the financial domain in the candidate correspondence.

As shown by operation 506, the apparatus 200 may include means, such as processor 202, memory 204, AI modeling circuitry 212, and/or the like for generating a fraud likelihood score associated with the candidate correspondence based in part on the one or more correspondence inconsistencies detected in the candidate correspondence. In this regard, the AI modeling circuitry 212 may be configured to leverage the correspondence fraud detection model to assign various correspondence fault severity weights to various respective correspondence inconsistencies detected in candidate correspondence. As described herein, a correspondence fault severity weight may be a numerical value representing the severity, criticality, importance, and/or impact of a particular type of correspondence inconsistency.

As a non-limiting example, the correspondence fraud detection model may assign a first correspondence fault severity weight to a first correspondence inconsistency associated with an enterprise correspondence style rule (e.g., text formatting rule, text emphasis rule, text style rule, etc.) detected in candidate correspondence and assign a second correspondence fault severity weight to a second correspondence inconsistency associated with a user data obfuscation rule (e.g., a rule for displaying PII, account information, etc. associated with a user) detected in the candidate correspondence. In various embodiments, the first correspondence fault severity weight related to the enterprise correspondence style rule may be associated with a lower numerical value relative to the numerical value associated with the second correspondence fault severity weight related to the user data obfuscation rule. In such an example, the correspondence fraud detection model may place more importance on the correspondence inconsistency associated with the user data obfuscation rule (e.g., assign a higher correspondence fault severity weight) than the correspondence inconsistency associated with the enterprise correspondence style rule, as the presentation and proper obfuscation of user data is associated with a higher security risk.

In this regard, the AI modeling circuitry 212 may be configured to leverage the correspondence fraud detection model to generate a fraud likelihood score associated with the candidate correspondence based at least in part on the correspondence fault severity weights associated with the one or more correspondence inconsistencies associated with the candidate correspondence.

Turning next to FIG. 6, flowchart 600 illustrates example operations for generating a fraud likelihood score based in part on a document similarity score for use in detecting correspondence fraud. As described herein, FIG. 5 illustrates some example implementations of operation 408 described herein with reference to FIG. 4.

As shown by operation 602, the apparatus 200 may include means, such as processor 202, memory 204, AI modeling circuitry 212, and/or the like for determining a candidate correspondence configuration of a candidate correspondence. In various embodiments, the AI modeling circuitry 212 may be configured to leverage the correspondence fraud detection model to determine a candidate correspondence configuration associated with the candidate correspondence. A candidate correspondence configuration may be a form, style, configuration, and/or the like characterized by a layout (e.g., placement, arrangement, organization, etc.) of the correspondence content data associated with the candidate correspondence. As a non-limiting example, the candidate correspondence configuration may describe and/or represent the layout, format, arrangement, organization, and/or placement of various portions of correspondence content data including user data, enterprise data, letterhead data, branding object (e.g., image object, logo, imprint, etc.), text content data, text style data (e.g., heading styles, paragraph styles, etc.), salutation data, and/or the like associated with the candidate correspondence. In examples in which the candidate correspondence is digital correspondence (e.g., email), the candidate correspondence configuration may further include data related to a structure, organization, and/or configuration of one of more interactive user interface elements (e.g., HTML elements, control elements (buttons, hyperlinks, etc.)), page source code elements, and/or the like.

As shown by operation 604, the apparatus 200 may include means, such as processor 202, memory 204, enterprise data management circuitry 210, AI modeling circuitry 212, and/or the like for comparing (e.g., matching) the candidate correspondence configuration to at least a first known correspondence configuration of one or more known correspondence configurations. In this regard, the AI modeling circuitry 212, in conjunction with the enterprise data management circuitry 210, may be configured to leverage the correspondence fraud detection model to compare (e.g., match) the candidate correspondence configuration to one or more known correspondence configurations in order to determine whether the candidate correspondence originated from the enterprise purported to have transmitted the candidate correspondence.

In various embodiments, the one or more known correspondence configurations may be comprised in a library of forms associated with the enterprise. A library of forms may be a data store (e.g., a cloud-based data store accessible by the communications network 104) configured to manage data related to one or more known enterprise form letters, known correspondence configurations, known fraudulent correspondences, and/or the like. In some examples, an enterprise may utilize one or more form letters comprised in the library of forms to generate correspondence for one or more users, where the one or more form letters are mass-distributed letters regarding various common topics related to the enterprise. As a non-limiting example, an enterprise associated with the financial domain (e.g., a banking institution) may have form letters regarding various account status data where the majority of the form letter may applicable to every user associated with the enterprise (e.g., the majority of the body text) and only a portion of the form letter needs to be updated to suit an individual user (e.g., user account information, PII, etc.). As another non-limiting example, the library of forms may comprise enterprise form letters associated with various promotions, products, services, and/or the like to be distributed to a plurality of users.

Additionally or alternatively, in some embodiments, the library of forms may comprise various known fraudulent correspondence that has been previously circulated to one or more other users associated with the enterprise. As a non-limiting example, an enterprise may cause the storage of fraudulent correspondence related to a known credit card scam so that future attempts by fraudsters to carry out the same credit card scam on other users associated with the enterprise may be mitigated by the correspondence fraud detection system 102. In this regard, data associated with one or more correspondence configurations associated with known forms letters, known correspondence configurations, known fraudulent correspondence, and/or the like may be stored in the library of forms and compared (e.g., matched) to candidate correspondence by the correspondence fraud detection model to determine whether the candidate correspondence is fraudulent.

As shown by operation 606, the apparatus 200 may include means, such as processor 202, memory 204, AI modeling circuitry 212, and/or the like for generating a document similarity score associated with the candidate correspondence and the at least first known correspondence configuration. For example, the AI modeling circuitry 212 may be configured to leverage the correspondence fraud detection model to generate a document similarity score based on the comparison (e.g., matching) of the candidate correspondence configuration of the candidate correspondence to one or more known correspondence configurations stored in the library of forms.

In various embodiments, the document similarity score associated with the candidate correspondence and a respective known correspondence configuration may be any numerical value within a predefined numerical range (e.g., a number between zero and one) and may indicate a probability that the candidate correspondence matches known correspondence such as known enterprise correspondence (e.g., a known form letter, known promotional letter), known fraudulent correspondence (e.g., correspondence associated with a known credit card scam, known romance scam, known impersonation scam, known phishing scam, etc.), and/or the like. In such embodiments, the correspondence fraud detection model may generate the document similarity score based at least in part on the number of elements of the candidate correspondence configuration (e.g., layout, format, arrangement, organization, and/or placement of various portions of correspondence content data) that match respective elements of the at least first known correspondence configuration. For example, the correspondence fraud detection model may assign a relatively high document similarity score (e.g., 0.7, 0.8, or any other numerical value) if a predefined number of elements of the candidate correspondence configuration (e.g., three or more, four or more, etc.) match respective elements of the at least first known correspondence configuration. Similarly, the correspondence fraud detection model may assign a relatively low document similarity score (e.g., 0.3, 0.2, or any other numerical value) if only a small number of elements of the candidate correspondence configuration (e.g., two or less, one or less, etc.) match respective elements of the at least first known correspondence configuration.

Alternatively, in various other embodiments, the document similarity score may be a binary value (e.g., zero or one) indicating whether the candidate correspondence configuration matches a correspondence configuration of a respective known correspondence. For example, the correspondence fraud detection model may assign a document similarity score that is a binary value (e.g., zero) indicating that the candidate correspondence configuration does not match a correspondence configuration of the at least first known correspondence in response to determining that a predefined number of elements of the candidate correspondence configuration (e.g., two or more, three or more, etc.) do not match respective elements of the at least first known correspondence configuration.

As shown by operation 608, the apparatus 200 may include means, such as processor 202, memory 204, AI modeling circuitry 212, and/or the like for generating a fraud likelihood score associated with the candidate correspondence based in part on the document similarity score. For example, the AI modeling circuitry 212 may be configured to generate the fraud likelihood score based at least in part on the document similarity score associated with the candidate correspondence configuration and the at least first known correspondence configuration. In some embodiments, the fraud likelihood score may be generated based solely on the document similarity score associated with the candidate correspondence configuration and the at least first known correspondence configuration. Alternatively, in various other embodiments, the document similarity score may be used to augment, adjust, update, and/or otherwise contribute to a fraud likelihood score generated by the AI modeling circuitry 212 based on a set of correspondence faults detected in the candidate correspondence (e.g., as described herein with reference to FIGS. 4 and 5).

In this regard, the AI modeling circuitry 212 may be configured to determine whether the document similarity score is associated with known fraudulent correspondence. For example, if the first known correspondence configuration is related to known fraudulent correspondence, the document similarity score associated with the candidate correspondence configuration and the first known correspondence configuration may negatively impact the fraud likelihood score associated with the candidate correspondence (e.g., the fraud likelihood score may increase based upon the determination that the candidate correspondence is the same or similar to the known fraudulent correspondence). Alternatively, if the first known correspondence configuration is related to known enterprise correspondence (e.g., an authentic form letter associated with the enterprise), the document similarity score associated with the candidate correspondence configuration and the first known correspondence configuration may positively impact the fraud likelihood score associated with the candidate correspondence (e.g., the fraud likelihood score may decrease based upon the determination that the candidate correspondence is the same or similar to the known enterprise correspondence).

Turning next to FIG. 7, flowchart 700 illustrates example operations for generating a fraud likelihood score based in part on decrypting a correspondence authentication object associated with a candidate correspondence for use in detecting correspondence fraud. As described herein, FIG. 7 illustrates some example implementations of operation 408 described herein with reference to FIG. 4.

As shown by operation 702, the apparatus 200 may include means, such as processor 202, memory 204, communications hardware 206, correspondence fraud detection circuitry 208, and/or the like for receiving a correspondence authentication object decryption request associated with a candidate correspondence. For example, in some embodiments, the communications hardware 206 may receive the correspondence authentication object decryption request from a user device (e.g., user device 108A) based on a user interaction with a software application instance managed by the correspondence fraud detection circuitry 208. In various examples, the correspondence authentication object decryption request may be a request to decrypt a correspondence authentication object comprised within the candidate correspondence. Non-limiting examples of a correspondence authentication object may include a QR code, a data matrix, a barcode, a UPC, an MRC, an EAN, a databar, a codabar, and/or the like. In some examples, the correspondence authentication object decryption request may be automatically generated and/or transmitted to the correspondence fraud detection system 102 in response to a respective correspondence authentication object being scanned (e.g., imaged) by an imaging device (e.g., a rear-facing camera) associated with a respective user device (e.g., user device 108A).

As shown by operation 704, the apparatus 200 may include means, such as processor 202, memory 204, correspondence fraud detection circuitry 208, and/or the like for decrypting a correspondence authentication object associated with the candidate correspondence. For example, the correspondence fraud detection circuitry 208 may facilitate the decryption of the one or more correspondence authentication objects in order to access correspondence identification information associated with the candidate correspondence. In various embodiments, the correspondence identification information may comprise correspondence identification data (e.g., form letter identifiers), correspondence content data, subject matter data, delivery, correspondence source data, and/or intended recipient data (e.g., user data) associated with the candidate correspondence. In this regard, the correspondence identification information may be employed by the correspondence fraud detection circuitry 208 and/or the AI modeling circuitry 212 to identify, verify, and/or otherwise authenticate the candidate correspondence.

As shown by operation 706, the apparatus 200 may include means, such as processor 202, memory 204, correspondence fraud detection circuitry 208, enterprise data management circuitry 210, AI modeling circuitry 212, and/or the like for generating a correspondence delivery matching score. For example, the correspondence fraud detection circuitry 208 may work in conjunction with the AI modeling circuitry 212 to leverage the correspondence fraud detection model to generate a correspondence delivery matching score based on a comparison (e.g., matching) of the correspondence identification information associated with the candidate correspondence to one or more correspondence delivery records. In this regard, the enterprise data management circuitry 210 may be configured to store correspondence delivery records detailing the generation, addressing, transmission, delivery success, and/or delivery failure of any correspondence and/or external communications (e.g., communications with users) associated with a respective enterprise. As such, the AI modeling circuitry 212 may be configured to generate a correspondence delivery matching score indicating whether the candidate correspondence originated from a respective enterprise purported to have transmitted the candidate correspondence and thereby determine whether the candidate correspondence is fraudulent.

In various embodiments, the correspondence delivery matching score associated with the candidate correspondence may be any numerical value within a predefined numerical range (e.g., a number between zero and one) and may indicate a probability that the candidate correspondence originated from a respective enterprise (e.g., was generated, transmitted, and/or delivered on behalf of the enterprise). In such embodiments, the correspondence fraud detection model may generate the correspondence delivery matching score based at least in part on the number of elements of the correspondence identification information (e.g., correspondence identification data (e.g., form letter identifiers), correspondence content data, subject matter data, delivery, correspondence source data, and/or intended recipient data (e.g., user data)) that match respective data associated with the delivery records of the enterprise. For example, the correspondence fraud detection model may assign a relatively high correspondence delivery matching score (e.g., 0.8, 0.9, or any other numerical value) if a predefined number of elements of the correspondence identification information (e.g., three or more, four or more, etc.) match respective elements of the delivery records of the enterprise. Similarly, the correspondence fraud detection model may assign a relatively low correspondence delivery matching score (e.g., 0.2, 0.1, or any other numerical value) if only a small number of elements of the correspondence identification information (e.g., two or less, one or less, etc.) match respective elements of the delivery records of the enterprise.

Alternatively, in various other embodiments, the correspondence delivery matching score may be a binary value (e.g., zero or one) indicating whether the candidate correspondence configuration originated from the enterprise. For example, the correspondence fraud detection model may assign a correspondence delivery matching score that is a binary value (e.g., zero) indicating that the candidate correspondence did not originate from the enterprise in response to determining that a predefined number of elements of the correspondence identification information (e.g., two or more, three or more, etc.) do not match respective elements of the delivery records of the enterprise.

As shown by operation 708, the apparatus 200 may include means, such as processor 202, memory 204, AI modeling circuitry 212, and/or the like for generating a fraud likelihood score for the candidate correspondence based in part on the correspondence delivery matching score. For example, the AI modeling circuitry 212 may be configured to generate the fraud likelihood score based at least in part on the correspondence delivery matching score associated with the candidate correspondence. In some embodiments, the AI modeling circuitry 212 may be configured to generate the fraud likelihood score based solely on the correspondence delivery matching score associated with the candidate correspondence. Alternatively, in various other embodiments, the correspondence delivery matching score may be used to augment, adjust, update, and/or otherwise contribute to a fraud likelihood score generated by the AI modeling circuitry 212 based on a set of correspondence faults and/or a document similarity score associated with the candidate correspondence (e.g., as described herein with reference to FIGS. 4-6).

FIGS. 4-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved correspondence fraud detection. Example embodiments thus provide tools that overcome the problems faced by conventional fraud detection mechanisms which, in some scenarios, require additional attention and effort on the part of the user to determine whether a particular candidate correspondence is fraudulent. By avoiding the use of conventional fraud detection mechanisms, example embodiments thus save time and resources, while also eliminating the possibility of a user engaging with fraudulent correspondence by mistake. Moreover, embodiments described herein counter a wide variety of emerging risks in an evolving technological landscape.

For instance, example embodiments provide protection against enterprise impersonation attempts configured to fraudulently solicit user data and/or enterprise data by intentionally misleading a user to believe they are being contacted by an enterprise with which they are affiliated. Furthermore, example embodiments provide protection against fraudulent correspondence configured in a variety of formats (e.g., print formats, digital formats, etc.). For example, as described herein, example embodiments leverage a software application instance associated with the correspondence fraud detection system in order to facilitate the imaging, scanning, submission, and/or authentication of printed correspondence (e.g., printed correspondence received by mail).

By employing the AI-based correspondence fraud detection model described herein, users are able to verify that the data and/or requested actions in the candidate correspondence are authentic. For instance, the correspondence fraud detection model may be employed to detect various errors and/or correspondence inconsistencies in the candidate correspondence that contradict various enterprise guidelines and/or ground-truths and may not be readily apparent to a user who has received the candidate correspondence. Furthermore, example embodiments leverage AI technologies to make the correspondence fraud detection system described herein more robust against future correspondence fraud by storing known fraudulent correspondence and/or potentially fraudulent correspondence in a library of forms (e.g., in addition to known enterprise correspondence) that can be used to evaluate future candidate correspondence submitted users.

As these examples all illustrate, example embodiments contemplated herein provide technical solutions that solve real-world problems faced by users receiving potentially fraudulent correspondence in a variety of formats. And while fraud such as enterprise impersonation and phishing has been an issue for years, the ubiquitous use of form letters, direct mail (in digital and print formats), and network-accessible data related to both enterprises and individuals has made this problem significantly more acute, especially as fraud techniques become more sophisticated. At the same time, the recently arising ubiquity of AI-based technologies has unlocked new avenues to solving these problems that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for dynamic correspondence fraud detection, the method comprising:

receiving, by communications hardware, candidate correspondence associated with a user and an enterprise, wherein the candidate correspondence comprises at least one correspondence authentication object;

extracting, by artificial intelligence (AI) modeling circuitry, correspondence content data from the candidate correspondence;

detecting, by the AI modeling circuitry and based on the correspondence content data, a set of correspondence faults associated with the candidate correspondence;

receiving, by the communications hardware, a correspondence authentication object decryption request;

decrypting, by correspondence fraud detection circuitry and based on the correspondence authentication object decryption request, the at least one correspondence authentication object to access correspondence identification information associated with the candidate correspondence;

generating, by the AI modeling circuitry and based on the set of correspondence faults and the correspondence identification information, a fraud likelihood score associated with the candidate correspondence;

determining, by the AI modeling circuitry and based on the fraud likelihood score, an authenticity category for the candidate correspondence, wherein the authenticity category is indicative of whether the candidate correspondence originated from the enterprise with which the user is associated; and providing, by the communications hardware, a correspondence fraud evaluation, wherein the correspondence fraud evaluation comprises an indication of the authenticity category for the candidate correspondence.

2. The method of claim 1, wherein determining the authenticity category for the candidate correspondence includes determining that the candidate correspondence did not originate from the enterprise with which the user is associated, wherein the method further comprises:

providing, by the communications hardware, one or more suspected fraudulent correspondence alerts associated with the candidate correspondence to one or more computing devices.

3. The method of claim 1, wherein the fraud likelihood score associated with the candidate correspondence is generated further based on the one or more correspondence inconsistencies.

4. The method of claim 1, wherein generating the fraud likelihood score associated with the candidate correspondence further comprises:

determining, by the AI modeling circuitry, a candidate correspondence configuration of the candidate correspondence, wherein the candidate correspondence configuration is characterized by a layout of one or more portions of the correspondence content data in the candidate correspondence;

matching, by the AI modeling circuitry, the candidate correspondence configuration to at least a first known correspondence configuration associated with a first known correspondence stored in a library of forms associated with the enterprise;

generating, by the AI modeling circuitry and based on matching the candidate correspondence configuration to the first known correspondence configuration, a document similarity score associated with the candidate correspondence and the first known correspondence; and generating, by the AI modeling circuitry, the fraud likelihood score associated with the candidate correspondence based in part on the document similarity score.

5. The method of claim 4, wherein the first known correspondence stored in the library of forms is authenticated correspondence associated with the enterprise.

6. The method of claim 4, wherein the first known correspondence stored in the library of forms is known fraudulent correspondence.

7. The method of claim 1, wherein generating the fraud likelihood score associated with the candidate correspondence further comprises:

determining, by the AI modeling circuitry, a total number of correspondence faults in the set of correspondence faults;

determining, by the AI modeling circuitry and for each correspondence fault in the set of correspondence faults, a correspondence fault severity weight; and generating, by the AI modeling circuitry, the fraud likelihood score based in part on the total number of correspondence faults and the correspondence fault severity weights associated with the set of correspondence faults.

8. The method of claim 1, wherein the candidate correspondence is a digital representation of printed correspondence.

9. The method of claim 1, wherein generating the fraud likelihood score associated with the candidate correspondence further comprises:

generating, by the AI modeling circuitry and based on matching the correspondence identification information to one or more correspondence delivery records associated with the enterprise, a correspondence delivery matching score; and generating, by the AI modeling circuitry, the fraud likelihood score based in part on the correspondence delivery matching score.

10. The method of claim 9, wherein the at least one correspondence authentication object is configured to be scanned by an image capturing device, and wherein the at least one correspondence authentication object is configured as at least one of a quick response (QR) code, a data matrix, a barcode, a universal product code (UPC), a machine-readable code (MRC), a European article number (EAN), a databar, or a codabar.

11. The method of claim 1, wherein the ground-truth data associated with the enterprise includes one or more enterprise correspondence style rules, wherein the enterprise correspondence style rules may include any combination of a correspondence tone, enterprise branding rules, enterprise contact data, enterprise product data, data obfuscation rules, correspondence delivery records, domain knowledge data, and library of forms data.

12. An apparatus for dynamic correspondence fraud detection, the apparatus comprising:

communications hardware configured to:

receive candidate correspondence associated with a user and an enterprise, wherein the candidate correspondence comprises at least one correspondence authentication object associated with the enterprise, receive a correspondence authentication object decryption request, and provide a correspondence fraud evaluation, wherein the correspondence fraud evaluation comprises an indication of an authenticity category for the candidate correspondence;

correspondence fraud detection circuitry configured to:

decrypt, based on the correspondence authentication object decryption request, the at least one correspondence authentication object to access correspondence identification information associated with the candidate correspondence; and artificial intelligence (AI) modeling circuitry configured to:

extract correspondence content data from the candidate correspondence, detect, based on the correspondence content data, a set of correspondence faults associated with the candidate correspondence, generate, based on the set of correspondence faults, a fraud likelihood score associated with the candidate correspondence, generate, based on matching the correspondence identification information to one or more correspondence delivery records associated with the enterprise, a correspondence delivery matching score, and determine, based on the fraud likelihood score and the correspondence delivery matching score, the authenticity category for the candidate correspondence, wherein the authenticity category is indicative of whether the candidate correspondence originated from the enterprise with which the user is associated.

13. The apparatus of claim 12, wherein the communications hardware is further configured to:

in response to the AI modeling circuitry determining an authenticity category indicative that the candidate correspondence did not originate from the enterprise with which the user is associated:

provide one or more suspected fraudulent correspondence alerts associated with the candidate correspondence to one or more computing devices.

14. The apparatus of claim 12, wherein the fraud likelihood score associated with the candidate correspondence is generated further based on the one or more correspondence inconsistencies.

15. The apparatus of claim 12, wherein generating the fraud likelihood score associated with the candidate correspondence further causes the AI modeling circuitry to:

determine a candidate correspondence configuration of the candidate correspondence, wherein the candidate correspondence configuration is characterized by a layout of one or more portions of the correspondence content data in the candidate correspondence;

match, the candidate correspondence configuration to at least a first known correspondence configuration associated with a first known correspondence stored in a library of forms associated with the enterprise;

generate, based on matching the candidate correspondence configuration to the first known correspondence configuration, a document similarity score associated with the candidate correspondence and the first known correspondence; and generate the fraud likelihood score associated with the candidate correspondence based in part on the document similarity score.

16. The apparatus of claim 12, wherein generating the fraud likelihood score associated with the candidate correspondence further causes the AI modeling circuitry to:

determine a total number of correspondence faults in the set of correspondence faults;

determine, for each correspondence fault in the set of correspondence faults, a correspondence fault severity weight; and generate the fraud likelihood score based in part on the total number of correspondence faults and the correspondence fault severity weights associated with the set of correspondence faults.

17. The apparatus of claim 12, wherein the candidate correspondence is a digital representation of printed correspondence.

18. The apparatus of claim 12, wherein the communications hardware is further configured to receive a correspondence authentication object decryption request, and wherein the AI modeling circuitry is further configured to generate the fraud likelihood score based in part on the correspondence delivery matching score.

19. The apparatus of claim 12, wherein the ground-truth data associated with the enterprise includes one or more enterprise correspondence style rules, wherein the enterprise correspondence style rules may include any combination of a correspondence tone, enterprise branding rules, enterprise contact data, enterprise product data, data obfuscation rules, correspondence delivery records, domain knowledge data, and library of forms data.

20. A computer program product for dynamic correspondence fraud detection, the computer program product comprising at least one non-transitory computer-readable storage medium storing software instructions that, when executed, cause an apparatus to:

receive, by communications hardware, candidate correspondence associated with a user and an enterprise, wherein the candidate correspondence comprises at least one correspondence authentication object associated with the enterprise;

receive a correspondence authentication object decryption request;

extract, by artificial intelligence (AI) modeling circuitry, correspondence content data from the candidate correspondence;

detect, by the AI modeling circuitry and based on the correspondence content data, a set of correspondence faults associated with the candidate correspondence;

generate, by the AI modeling circuitry and based on the set of correspondence faults, a fraud likelihood score associated with the candidate correspondence;

decrypt, based on the correspondence authentication object decryption request, the at least one correspondence authentication object to access correspondence identification information associated with the candidate correspondence;

generate, based on matching the correspondence identification information to one or more correspondence delivery records associated with the enterprise, a correspondence delivery matching score;

determine, by the AI modeling circuitry and based on the fraud likelihood score and the correspondence delivery matching score, an authenticity category for the candidate correspondence, wherein the authenticity category is indicative of whether the candidate correspondence originated from the enterprise with which the user is associated; and provide, by the communications hardware, a correspondence fraud evaluation, wherein the correspondence fraud evaluation comprises an indication of the authenticity category for the candidate correspondence.

\* \* \* \* \*